TABULATED VALUES

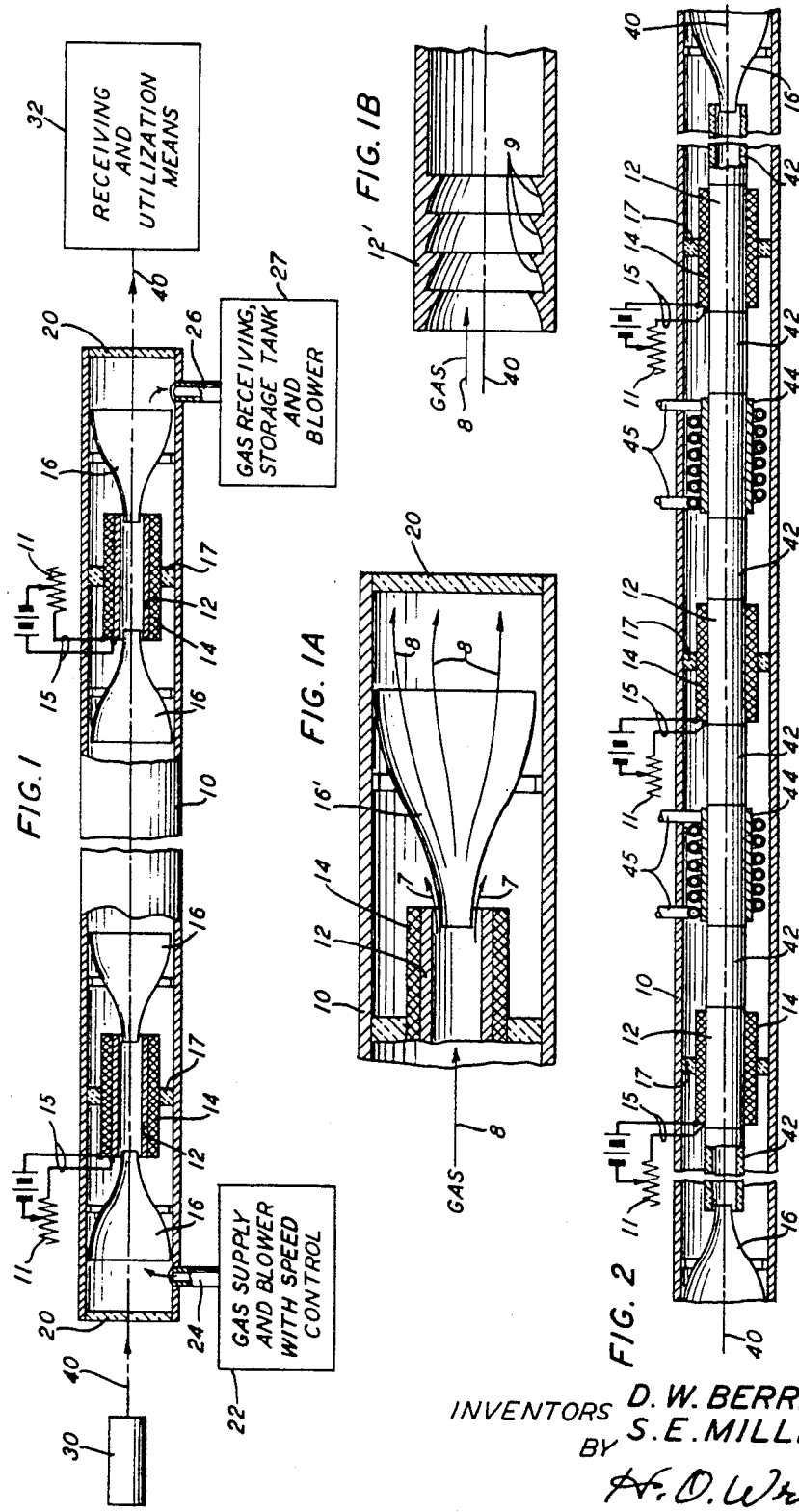

| X | $R_0(X)$ | $F(X)$ | $R_1(X)$ | $R_2(X)$ |
|---|---|---|---|---|
| 0 | 1 | 1 | 1 | 1 |
| 0.1 | 0.9818 | 0.9805 | 0.8923 | 0.753 |
| 0.2 | 0.9290 | 0.9261 | 0.6067 | 0.206 |
| 0.3 | 0.8456 | 0.8432 | 0.2367 | 0.290 |
| 0.4 | 0.7382 | 0.7382 | -0.1062 | -0.407 |
| 0.5 | 0.6147 | 0.6175 | -0.3399 | -0.204 |
| 0.6 | 0.4833 | 0.4880 | -0.4317 | 0.104 |
| 0.7 | 0.3506 | 0.3535 | -0.3985 | 0.278 |
| 0.8 | 0.2244 | 0.2244 | -0.3051 | 0.278 |
| 0.9 | 0.1089 | 0.1041 | -0.1637 | 0.144 |
| 1.0 | 0 | 0 | 0 | 0 |

TEMPERATURE DISTRIBUTION ALONG THE TUBE AXIS FOR $r=0$

RADIAL TEMPERATURE DISTRIBUTION

POWER CONSUMPTION OF GAS LENS

CURVATURE OF Δφ AT r = 0

CURVATURE OF Δφ AT r = 0

RAY PATHS
ALL CONVERGENT LENS SYSTEM
S=2f

RAY PATHS FOR
SYSTEM OF FIG. 18

$L = \sqrt{2}\,f$

RAY PATHS FOR
SYSTEM OF FIG. 3

$L = \sqrt{2}\,f$

RAY PATH FOR S = 4f

United States Patent Office 3,410,627
Patented Nov. 12, 1968

3,410,627
LIGHT GUIDES EMPLOYING GASEOUS LENSES
Dwight W. Berreman, Westfield, and Stewart E. Miller, Middletown, N.J., assignors to Bell Telephone Laboratories, Incorporated, New York, N.Y., a corporation of New York
Filed June 30, 1964, Ser. No. 379,175
12 Claims. (Cl. 350—179)

ABSTRACT OF THE DISCLOSURE

This application describes a gas lens system formed by a continuous flow of a gas, or a specific mixture of gases, through a conduit along which means are periodically located for establishing, over limited intervals, moderate radially directed temperature gradients transverse to the direction of gas flow and to the direction of beam propagation. The gradients are distributed along the wavepath in a regular manner such that the outer portion of the gas column traversing the conduit is alternately heated at said regular intervals and then cooled as it passes between successive heating intervals.

In an alternative arrangement, cooling intervals are introduced between successive heating intervals, producing an "alternating gradient focusing effect."

---

This invention relates to the long distance transmission of electromagnetic waves. More particularly, it relates to the long distance transmission of beams of ultrahigh frequency wave energy, including visible light and adjacent energy bands, and to the prevention of scattering of the rays of such beams during transmission.

The arrangements of the present application are related to those disclosed and claimed in the copending application, Ser. No. 347,166, filed Feb. 25, 1964 by applicant D. W. Berreman, assignor to applicants' assignee. Other copending applications of interest are Ser. No. 353,689, filed Mar. 23, 1964, by applicant D. W. Berreman, and Ser. No. 357,424, filed Apr. 6, 1964, by K. B. McAfee, both of which are also assigned ot applicants' assignee.

As will become apparent from a perusal of the present application, the arrangements of the present invention differ from those of the first mentioned Berreman application principally in that a column of gas is employed which is continuously moved along the conduit rather than a substantially static column as employed in said first mentioned Berreman application. Additional difference necessitated by the above-mentioned principal difference will become apparent as the description of applicants' arrangements, given hereinunder, proceeds.

Many arrangements for generating and utilizing extremely narrow, intense and highly directive beams of substantially coherent, very high frequency, electromagnetic wave energy, principally in the visible light and adjacent frequency bands, embracing wavelengths between the approximate limits of 1000 Angstroms and two million Angstroms, inclusive, have been devised during the last several years. Numerous and varied devices for generating such beams, usually designated "laser beams," have been and are being invented and developed with astonishing proliferation.

In view of the extremely high frequencies of such waves and the wide frequency range over which they are operative, the above development give promise of the practicability of utilizing vastly extended ranges of frequency for systems of extremely large capabilities for the transmission of intelligence such as speech, video, and data transmission signals and the like.

Notwithstanding the fact that lasers devised during the last few years are capable of producing extremely narrow, highly directive, substantially coherent energy beams, transmission of even these beams over substantial distances is usually accompanied by a very appreciable spreading of the beam, resulting in a large diminution of the energy received, usually referred to as attenuation, at a distant point on the axis of the beam. Beam spreading also involves the possibility that a significant portion of the energy beam may be intercepted by other stations as well as by the intended receiving station.

Furthermore, in many instances it is desired that the laser beam be transmitted through an enclosing pipe or conduit, of a material impervious to gas. A gas, or mixture of gases, can then be employed to fill the conduit thus providing a medium of controllable uniform and stable characteristics, so that the transmission can be rendered free from the well known unfavorable effects of transmission through the atmosphere such as those resulting from conditions such as rain, snow, sleet, fog, temperature effects and the like. Such a system, obviously, would, if the pipe or conduit is also opaque to light and energy of comparable wavelengths, eliminate all possibility of interception of portions of the beam by unauthorized receiving stations, thus assuming the preservation of complete privacy of communication.

The above-mentioned spreading of the beam when an enclosing conduit (which must necessarily have transverse cross-sectional dimensions much larger than the wavelength of the light or similar energy to be transmitted) is employed obviously may result, for a long distance system (several hundred miles long, for example) in the multiple reflection of the spreading rays by the conduit walls, destroying the coherency of the beam and producing serious attenuation and distortion of the transmitted signals. Thus it is apparent that the use of means for subsantially eliminating beam spreading is important even when an enclosing conduit is employed.

The present invention proposes as a first solution to reduce to substantial elimination the above described deleterious effects of beam spreading by introducing periodically throughout the length of the beam path a slight diversion of the outer rays of the beam toward the central axis of the path. The present invention further proposes the use of "alternating gradient focusing," sometimes heretofore referred to as "strong focusing" in which converging and diverging effects are alternately introduced in such manner that the net over-all effect is that of convergence.

The use of thin solid lenses of glass or the like distributed along the path for such a purpose has not proven very satisfactory both because of the substantial attenuation introduced by even the best of such lenses, in view of the large number of lenses required, and because of reflection effects at the surfaces of the lenses which are frequently aggravated by surface irregularities and by contamination of the surfaces.

Accordingly, it is proposed in accordance with the present invention to introduce a continuous flow of a gas or a specific mixture of gases through the conduit together with periodically introduced means for establishing over limited intervals moderate radially directed temperature gradients transversely to the path traversed by the gas or gases and the energy beam. The gradients are distributed along the path in a regular manner such that the outer layers of the column of gas traversing the conduit are alternately heated at said regular intervals and permitted to cool in passing between successive heating intervals. Several modifications of the generic arrangements are suggested but the common objective of all is to produce convergence in the vicinity of the heating intervals in such manner that rays which tend to diverge from the axis of the beam are periodically deflected toward the axis in much the same way as they would be were a plurality of thin, long focal length, solid lenses introduced at appropriate intervals along the axis of the beam.

As mentioned above, an alternative arrangement of this application also suggests is that emphasized cooling intervals may be introduced between successive heating intervals producing an "alternating gradient focusing effect," sometimes heretofore referred to as the "strong focusing effect."

The resultant collimating effect in either of the above suggested arrangements can then be proportioned to substantially eliminate the deleterious effects otherwise introduced by the tendency of the beam to spread.

Accordingly, a principal object of the invention is to eliminate the difficulties resulting from beam spreading in light and other very high frequency energy beam transmission systems.

Other and further objects, features and advantages of the application of the principles of the present invention will become apparent from a perusal of the following detailed description of illustrative embodiments of such principles and the appended claims taken in conjunction with the accompanying drawing, in which:

FIG. 1 illustrates, in diagrammatic form, a first structure utilizing specific principles of the present invention;

FIG. 1A illustrates details of a preferred form of funnel for use in FIG. 1;

FIG. 1B illustrates details of a modification of the input end of a heated tube structure of the invention;

FIG. 2 illustrates in diagrammatic form a second structure utilizing further specific principles of the present invention;

Figure 17:
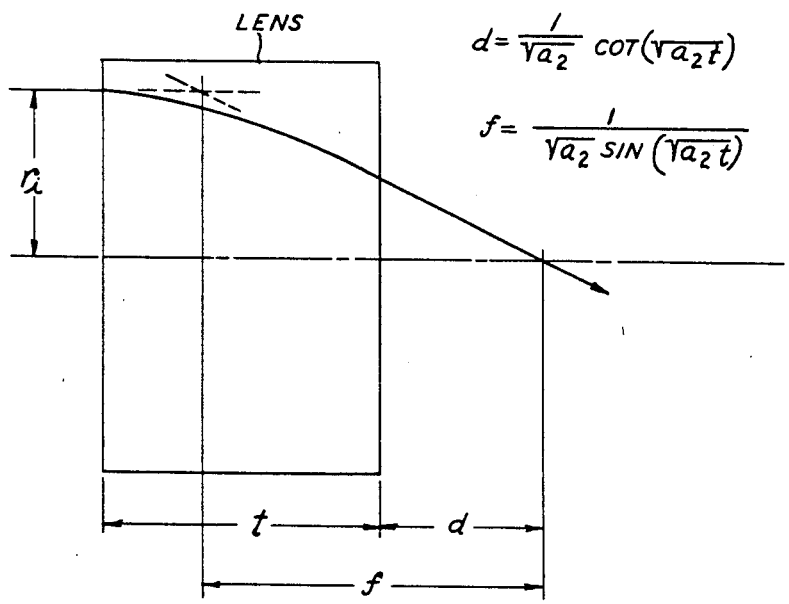

FIGS. 3 through 16, inclusive, are illustrative curves representing variations and interrelations of various of the parameters employed in the mathematical analysis of systems of the general type illustrated in FIG. 1;

FIG. 17 is a diagram employed in explaining the action of a lens of FIG. 1 of the invention;

FIGS. 18 through 21, inclusive, are diagrams employed in the mathematical analysis of alternating gradient focusing lens arrangements of the general type employed in the system of FIG. 2;

FIGS. 22 through 26, inclusive, are curves illustrative of the variations of various parameters employed in the mathematical analysis of alternating gradient focusing systems; and FIGS. 27 through 31, inclusive, are diagrams illustrating ray paths employed in describing the focusing action of alternating gradient focusing lens systems.

Identical structural features appearing in the figures of the drawing will be given corresponding designation numbers, respectively, and each feature will be described in detail in connection with the structure of the first figure in which it appears.

In more detail in FIG. 1, a specific design of an arrangement of the invention is illustrated in diagrammatic form. It comprises a conduit 10 which may, for example, have an internal diameter of substantially two inches and is intended to "house" a very high frequency, broadband communication medium comprising, for example, the beam 40 from a laser 30. Conduit 10 is impervious to gas and preferably also to very high frequency energy. It is also preferable, as will presently become apparent, that it be a good conductor of heat. Beam 40 may, for example, enter conduit 10 through a first window 20 at the left along the longitudinal axis of conduit 10, as shown. At the far end of the system, beam 40 passes through a second window 20 to receiving and utilization apparatus 32. Windows 20 may be high quality very thin plate glass.

At intervals of from three to six feet, center to center, focusing tubes 12 having, for example, internal diameters of substantially one-quarter inch and lengths of from six to eight inches are mounted concentrically with the longitudinally axis of conduit 10. An electrical heating coil 14 having leads 15 and a power control rheostat 11 surrounds each tube 12, a funnel 16 is preferably provided at each end of each tube 12, and the tube 12 and the aforementioned accessories are centrally supported within conduit 10 by a washer-shaped barrier member 17. Tube 12 is preferably a good heat conductor and member 17 should be a poor conductor of heat. A gas supply and blower 22 including a speed or volume control (not shown) for introducing gas into conduit 10 via input port 24 are provided at the left end of conduit 10. An exhaust port 26 is provided at the opposite or right end of conduit 10 and may lead, for example, to a gas storage tank 27. Blowing apparatus with appropriate controls may also be provided in connection with storage tank 27 so that periodically the accumulated gas may be blown back to supply 22 under which conditions the lens action will occur toward the left ends of tubes 12. The gas circulating system is preferably designed in accordance with principles well known to those skilled in the art so that the effective pressure within conduit 10 can be controlled and, if desired, raised or lowered by substantial amounts.

In FIG. 1A, a detailed showing to an enlarged scale of a preferred form 16' of funnel 16 of FIG. 1 is given. Assuming the end fragment of tube 12 and heating coil 14 represent the output end of a hot tube 12 and arrows 8 represent the flow of gas emerging from that end, a slight gap of approximately one-fifth the radius $a$ of tube 12 is preferably left between the adjacent ends of tube 12 and funnel 16'. Funnel 16' is made of thin sheet material, such as polystyrene or paper which is nonconductive to heat and flares gradually, substantially in the manner illustrated, until at its right end it has increased its diameter to substantially but not quite 2A, as shown, where A is the radius of the conduit 10. The small gap left around the large end of funnel 16' permits the escape of gas leaving tube 12 through the aforementioned gap between the small end of funnel 16' and tube 12. Arrows 7 indicate paths through the last mentioned gap between tube 12 and funnel 16 through which a substantial part of the hotter gases from tube 12 may escape. The remainder of the gas flows smoothly through funnel 16' and any "churning" or "turbulence" in the path of the laser beam is thus avoided. Ratios of funnel length to tube 12 diameter may vary from four to twenty. The inner diameter of conduit 10 may be from two to four times that of tube 12.

In FIG. 1B, a minor modification of tube 12 which may be introduced to increase the efficacy of the hot tube lens is illustrated. It comprises simply the provision of a number of internal serrations 9 at the input end of tube 12 which are shaped in a manner such, for example, as that illustrated in FIG. 1B to impart a tendency to the outermost layers of the gas flowing through the tube to be deflected slightly toward the axis of the tube thus speeding up the heating of strata of the air column intermediate the outer surface of the air column and the axis of the tube.

It is contemplated that over-all communication systems employing arrangements of the type illustrated in FIG. 1 may be employed to interconnect widely separated cities such, for example, as New York and Chicago, or New York and Los Angeles. In such a system, convenient subdivision of the over-all system would undoubtedly prove convenient and all heating coils of each section would probably be connected through a unitary control to a common power supply. Likewise, separate gas supplies, blowers and appropriate controls therefor would probably be provided for each section.

Supply and blower 32 furnishes sufficient gas to fill conduit 10 and to maintain a steady flow of gas through tubes 12 at a rate of from one to four miles per hour, by way of example. The rate of flow should not be increased to the point at which turbulence is induced as turbulence may introduce jitter and optical aberration. Air, carbon dioxide, and certain of the heavier gases such as methane have been employed in experimental arrangements of this type with satisfactory results. Also, mixtures of a lighter and a heavier gas as described and claimed in the above-mentioned copending application of K. B. McAfee can advantageously be employed.

Heating coils 14 having electrical leads 15 are provided with sufficient energy to raise the temperature of tubes 12 several degrees centigrade (usually less than 100 degrees) above the temperature of the conduit 10 and the gas introduced by source 22.

The stream of gas through each tube 12 has a parabolic velocity distribution because of the drag or friction with the inner surface of the tube, and in addition, the temperature gradient between the axis and the tube wall results in heating the gas nearer the tube wall more than that flowing along the axis, thus expanding the gas toward the outer layers of the column more than on the axis and producing a focusing effect.

Thus the arrangement of FIG. 1, as described in detail above, is intended to represent a long conduit provided with a large number of relatively closely spaced positive gas lenses each of which deflects the outer rays of the laser beam toward the axis thus substantially counteracting the tendency of the rays to spread.

Increased or decreased focusing within a considerable range may be effected by increasing or decreasing the temperature of the tubes 12 and/or altering the rate of flow of the gas through the tubes. Furthermore, the focusing effect is directly proportional to the pressure of the gas within the conduit (determined by the blower and exhaust pressures which are, of course, readily varied by arrangements well known and widely employed by those skilled in the art). Local and/or remote control of the focusing action of the "lenses" of such a system by individual lenses or by appropriate groups of lenses is therefore readily effected.

In FIG. 2 there is illustrated a modification of the arrangement of FIG. 1 in which the spaced segments 12 of the smaller diameter tube are incorporated in a continuous smaller diameter tube consisting of heat conducting sections 6 and 12 with intermediate non-heat conducting sections 42 connected in tandem, the composite tube being centrally positioned within the conduit 10, and alternate heating units 14 and the cooling units 44 having heat conducting tubular liners 6 are spaced along the outer side of the composite inner tube at regular intervals to provide alternately heated and cooled, regularly spaced sections of the composite tube.

Other features of a system in accordance with FIG. 2 may be substantially as described above in connection with FIG. 1.

Cooling units 44 may, for example, comprise simply metallic heat absorbers or sinks, or, alternatively, they may comprise sections of small diameter tubing coiled about tubular liners 6, the ends 45 of the tubing extending through conduit 10 so that a cooling fluid or refrigerant may be passed through the coils in such quantity and of such temperature as to maintain any of numerous specific temperature differentials between the cooled sections of the composite tube and the gas entering these sections. If the outer pipe or conducit 10 is of heat absorbing or heat conductive material, it can obviously aid cooling units 44 in absorbing and dissipating or dispersing heat.

As in the system of FIG. 1, the sections 12 of the composite tube which are heated will have a positive or converging focusing effect. On the other hand, the cooled tubular sections 6 within units 44 can conversely have a negative or diverging focusing effect. Accordingly, a system in accordance with FIG. 2 will obviously be an "alternating gradient" type of focusing system comprising a plurality of alternately positive and negative, regularly spaced, focusing regions. When properly proportioned, as will be discussed in detail hereinafter, the so-called "strong focusing effect" or "alternating gradient focusing effect" can be realized which will provide a net over-all positive focusing effect.

The mathematical analyses given hereinbelow are intended to demonstrate the fundamental theoretical considerations underlying the operation of the two types of focusing systems illustrated for example by the systems of FIGS. 1 and 2 described in detail above.

*Analysis of focusing systems*

As mentioned hereinabove, a communication system using a beam of light or similar ultrahigh frequency energy as the carrier of intelligence needs an efficient medium to propagate the energy from the transmitter to the receiver. Among several alternatives the idea has been suggested that an electromagnetic wave may be confined and propagated in a conduit employing spaced solid lenses. However, in a lens-waveguide system of this general type there is a wide range of possibilities as to what types of lenses to use. Conventional glass lenses present problems since they may not only absorb light in the glass medium itself but also because they present important reflection losses which can only partially be avoided by special techniques such as coating of the lens surfaces or making use of the Brewster angle or the like. Even if the best corrective measures are used, there is still a residual reflection and scattering of light due to unavoidable surface irregularities.

It appears that a great many of the problems connected with the use of solid (for example, glass) lenses could be overcome, if, instead of a high index medium such as glass, a very low index focusing medium were used. If the transition from a transparent gas into a dense medium such as glass could be avoided the problem of reflection in systems of the type under consideration would, for all practical purposes, not exist. Gases present themselves as an outstanding choice of a low index dielectric medium. Their dielectric constant can, of course, be influenced by changing their density. A change of density is most easily effected by varying the gas temperature.

In the first of the above-mentioned copending applications of applicant D. W. Berreman, it is disclosed that a successful gas lens was established in a stationary column of gas by maintaining a temperature gradient between a hot helix extending throughout the length of a cold cylindrical enclosure or conduit. Berreman observed that convection currents were essential in maintaining the proper temperature gradients. This is related to the idea of building a gas lens by blowing a cool gas into a hot tube within the conduit, as illustrated, for example, in FIG. 1 described in detail above. Since the gas obviously heats up first at the wall of the hot tube and remains cool longer at its center, it has a density distribution of higher density gas in the center of the tube and decreasing density towards the wall. Since an increase in density is accompanied by an increase in dielectric constant, it is easy to understand that the cool gas flowing through the hot tube acts as a positive lens and tends to form a light beam traveling along the axis of the tube.

This application accordingly presents hereinunder a theoretical treatment of the results of the temperature distribution in the gas and the difference in phase angle between two light beams, one traveling along the tube axis and the other traveling closer to the wall of the tube. This phase difference is, of course, a measure of the focusing power of the lens. For an economical lens, maximum phase shift with a minimum of thermal power is, of course, desired. Curves showing the power consumption of the lens as well as the ratio of phase difference to power consumption are presented hereinafter. These data are of value in the construction of an optimum lens. In general, different gases give different lens or focusing properties. A gas is most efficient if the ratio $(n-1)/k$ is large, where $n$ is the index of refraction of the gas and $k$ is its heat conductivity.

Temperature distribution

The theory of temperature distribution in a cool gas which is blown into a hot tube of constant temperature is presented in M. Jakob's book on "Heat Transfer," vol. 1, John Wiley and Sons, Inc., New York, 1949, pages 451–464.

It is assumed that the gas flow is laminar and has the radial velocity distribution of viscous fluid; then $$v(r) = v_0 \left[1 - \left(\frac{r}{a}\right)^2\right] \quad (1)$$

where $r$ = distance from tube axis $a$ = radius of tube $v_0$ = gas velocity at $r=0$; that is, on the axis.

Figure 3:
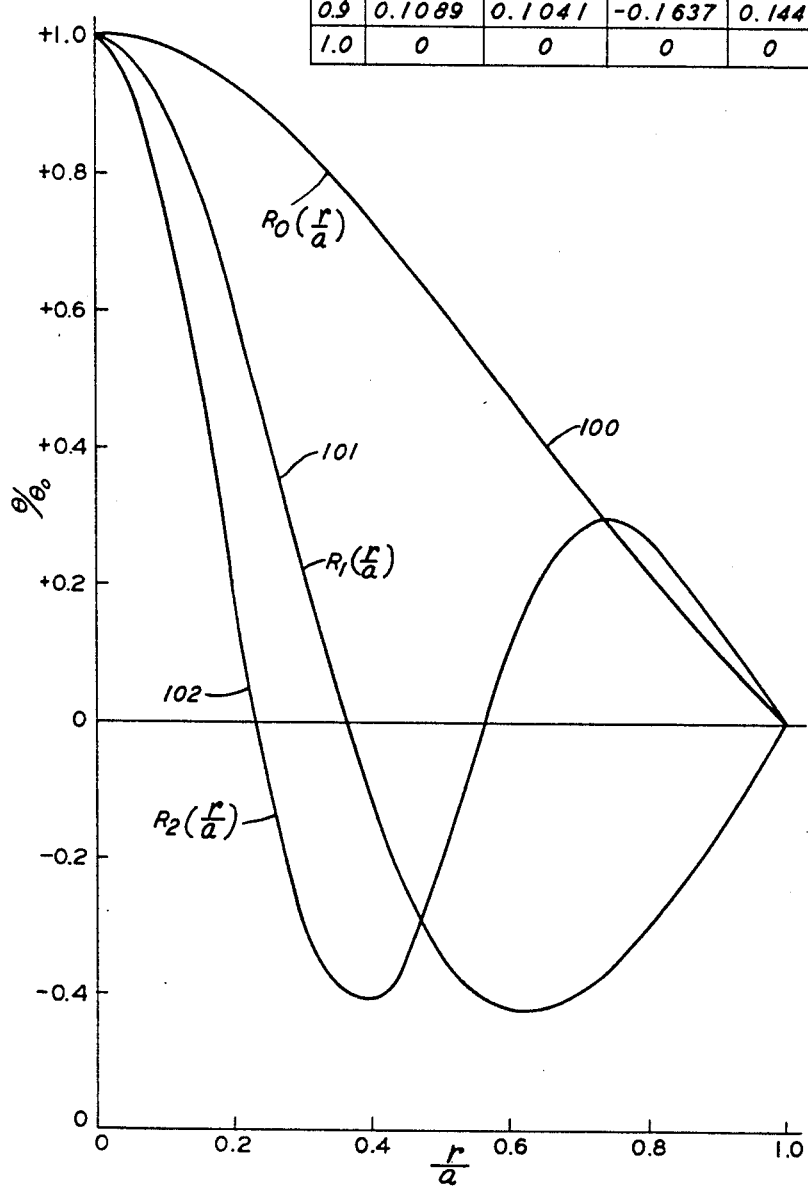

The temperature T of the gas is given as $$\theta = T_w - T$$

where $T_w$ is the temperature of the wall of the tube. It is normalized with respect to $$\theta_0 = T_w - T_0$$

with $T_0$ being the temperature of the cool gas before it enters the hot tube. $\theta/\theta_0$ is expanded in terms of functions $R_n(r/a)$ which are shown in FIG. 3, curves 100, 101 and 102, for $n=0$, 1 and 2, respectively. The temperature also depends on the longitudinal distance $z$ in the hot tube measured from the beginning or input end of the hot tube, the gas velocity $v_0$ and on the following material parameters:

$k$—heat conductivity measured in calories per centimeter second degrees Kelvin
$\rho$—gas density in grams per cubic centimeter
$c_p$—specific heat at constant pressure in calories per gram.

All these parameters depend somewhat on the temperature but are considered constant in the derivation of the theory. They enter the equations in the combination $$\sigma = \frac{k}{a v_0 \rho c_p} \quad (2)$$

The first three terms of the infinite series describing the temperature distribution in the tube are $$\frac{\theta}{\theta_0} = 1.477 e^{-7.316\sigma\frac{z}{a}} R_0\left(\frac{r}{a}\right) - 0.810 e^{-44.36\sigma\frac{z}{a}} R_1\left(\frac{r}{a}\right) + 0.385 e^{-106\sigma\frac{z}{a}} R_2\left(\frac{r}{a}\right) \pm \cdots \quad (3)$$

The approximation is of course fairly poor at $z=0$, that is, at the input end of the heated tube. However, the exponential factors in the higher terms of the series drop off very rapidly as the distance $z$ along the heated tube increases so that the approximation is already very good for values of $$\sigma \frac{z}{a} > 0.01$$

Figure 4:
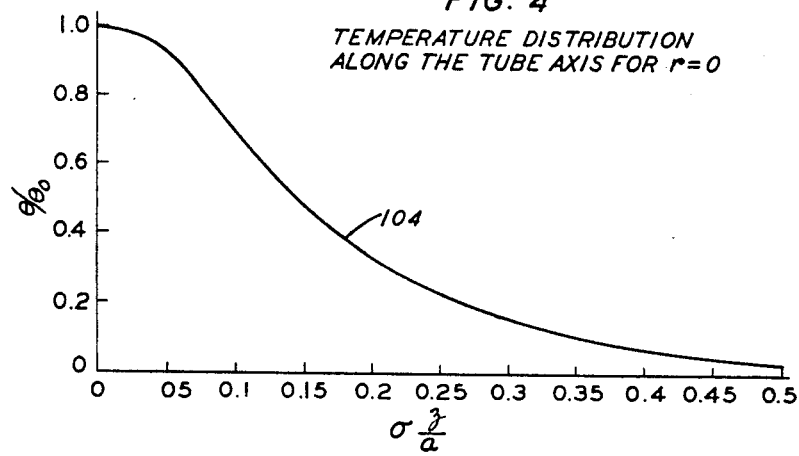

FIG. 4, curve 104, shows $\theta/\theta_0$ at $r=0$ as a function of $$\sigma \frac{z}{a}$$

It is apparent that for $$\sigma \frac{z}{a} > 0.05$$

the distribution of $\theta/\theta_0$ drops off exponentially.

Figure 5:
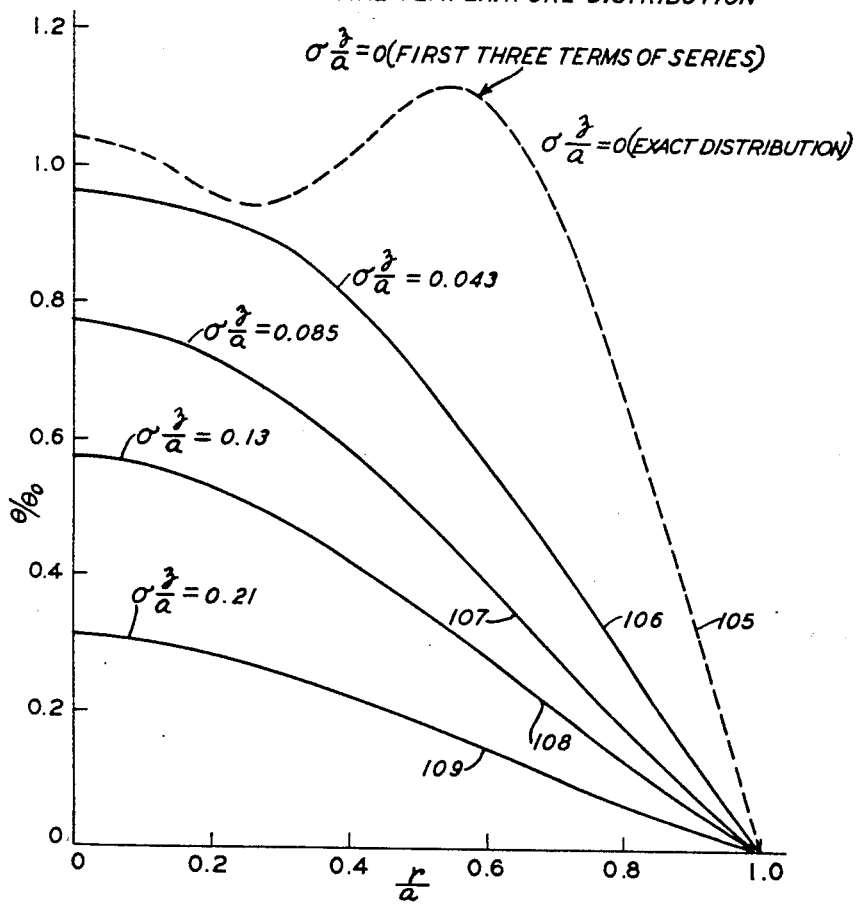

FIG. 5, curves 105 through 109, inclusive, shows the $r/a$ dependence of $\theta/\theta_0$ for different values of $$\sigma \frac{z}{a}$$

as indicated for each curve.

To make FIGS. 4 and 5 more meaningful, Table I lists the material parameters for several gases at 20° C. and a pressure of 760 millimeters of mercury.

TABLE I

| Gas | k (cal./cm. sec. deg.) | | $\rho$ (gram/cm.³) | | $c_p$ (cal./gram deg.) | $av_0\sigma = \dfrac{k}{\rho c_p}$ (cm.²/sec.) | n−1 | | $\dfrac{n-1}{k}$ (cm. sec. deg./cal.) |
|---|---|---|---|---|---|---|---|---|---|
| CO₂ | 3.93 | 10⁻⁵ | 1.84 | 10⁻³ | 0.199 | 0.107 | 4.20 | 10⁻⁴ | 10.7 |
| NH₃ | 5.90 | 10⁻⁵ | 0.72 | 10⁻³ | 0.523 | 0.157 | 3.48 | 10⁻⁴ | 5.9 |
| CH₄ | 7.80 | 10⁻⁵ | 0.67 | 10⁻³ | 0.528 | 0.220 | 4.13 | 10⁻⁴ | 5.3 |
| Air | 6.28 | 10⁻⁵ | 1.21 | 10⁻³ | 0.240 | 0.216 | 2.73 | 10⁻⁴ | 4.35 |
| H₂ | 41.0 | 10⁻⁵ | 0.084 | 10⁻³ | 3.39 | 1.44 | 1.23 | 10⁻⁴ | 0.30 |
| He | 35.0 | 10⁻⁵ | 0.166 | 10⁻³ | 1.25 | 1.69 | 0.34 | 10⁻⁴ | 0.097 |

Power consumption

The principle of operation of the gas flow lens requires that the cool gas inside the hot tube be heated. Even if all power losses to the environment are neglected, a certain amount of heat power is required to operate the lens. For a subsequent study of lens efficiency this basic power consumption must be ascertained. At any given length $z$ of the tube from its input end the power absorbed by the gas is obtained as $$P(z) = \int_0^a (T(r,z) - T_0)\rho c_p v(r) 2\pi r\, dr$$

$$= 2\pi \rho c_p v_0 \theta_0 \int_0^a r\left[1 - \left(\frac{r}{a}\right)^2\right]\left[1 - \frac{\theta(r,z)}{\theta_0}\right] dr \quad (4)$$

In order that the integration may be readily performed, the following restriction is introduced:

$$\sigma \frac{z}{a} > 0.05$$

It is then permissible to express $\theta/\theta_0$ by the first term of Equation 3. In addition, $R_0(x)$ is replaced by $$R_0(x) \approx F(x) = 1 - 2.06 x^2 + 1.06 x^3 \quad (5)$$

This approximation deviates no more than 2.5 percent from the actual value of $R_0(x)$. The values of $F(x)$ can be compared to those of $R_0(x)$ in the tabulation included in FIG. 3. The integration can now be performed readily to obtain the power $$P = \frac{\pi}{2} a^2 \rho c_p v_0 \theta_0 \left[1 - 0.820 e^{-7.316\sigma\frac{z}{a}}\right] \quad (6)$$

Figure 6:
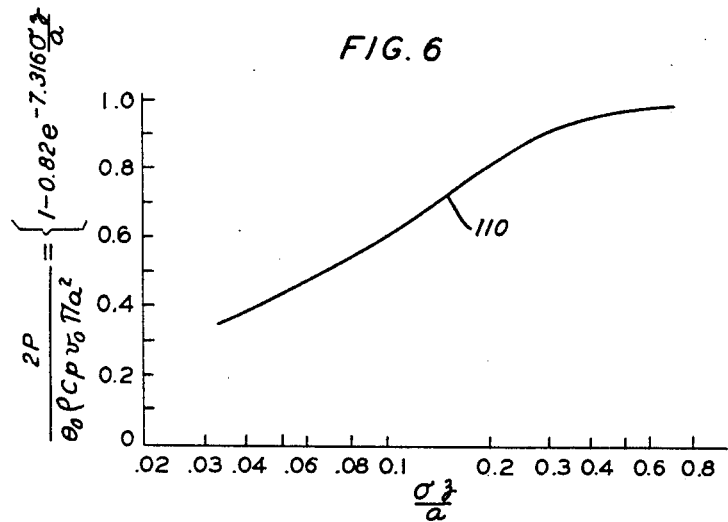

FIG. 6, curve 110, shows the power consumption as a function of normalized lens length, $$\sigma \frac{z}{a}$$

An alternative form in which Equation 6 may be written brings out the dependence of P on the flow velocity $v_0$ more clearly.

$$P = \frac{\pi}{2} k z \theta_0 \frac{v_0}{V}\left[1 - 0.820 e^{-7.316\frac{V}{v_0}}\right] \quad (7)$$

The quantity $$V = \frac{kz}{a^2 \rho c_p} = \sigma \frac{z}{a} v_0 \quad (8)$$

has the dimension of velocity and is characteristic of the gas and the tube geometry.

Figure 7:
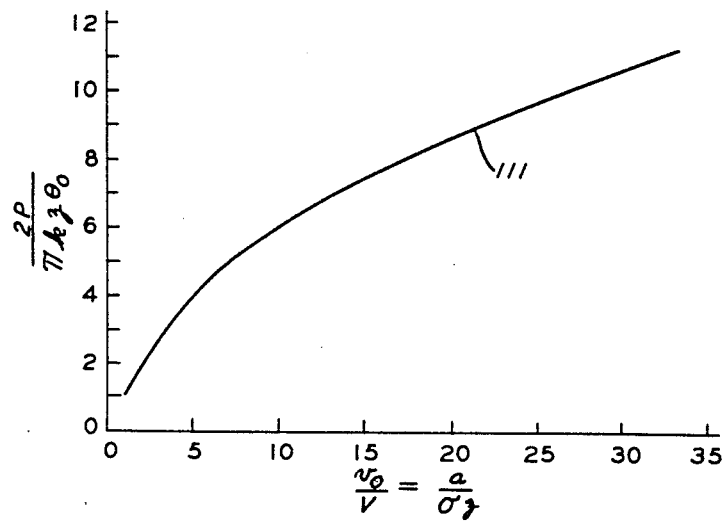

FIG. 7, curve 111, shows the power consumption as a function of normalized gas velocity, $v_o/V$.

The ratio of $V/v_o$ can be related to the time $t_o = z/v_o$ which it takes the gas particles on the axis to traverse the tube of length $z$ with the velocity $v_o$ and to a time $\tau$ which is defined by $$\frac{1}{\tau} = \frac{\frac{dT(0,t)}{dt}}{T_w - T(0,t)} \quad (9)$$

$\tau$ is characteristic of the heat diffusion rate in a gas which rests in a tube whose wall temperature is $T_w$. At $t=0$ the gas has the uniform temperature $T_o < T_w$. Its temperature at a given radius $r$ and time $t$ is $T(r,t)$ so that $T(0,t)$ is the time rate of temperature rise on the axis per degree of temperature difference between wall and axis.

It is shown that the relation $$\frac{V}{v_o} = 0.173 \frac{t_o}{\tau} = \frac{\sigma z}{a} \quad (10)$$

can be derived as follows.

The time development of a cool gas resting in a tube of wall temperature $T_w$ can be described as follows:

$$T = T_w - 2(T_w - T_o) \sum_{n=1}^{\infty} e^{-\lambda_n t} \frac{J_o\left(w_n \frac{r}{a}\right)}{w_n J_1(w_n)} \quad (10a)$$

with $$\lambda_n = \frac{k}{a^2 \rho c_p} w_n^2 \text{ and } J_o(w_n) = 0$$

At $t=0$ Equation 10a becomes $T(r,o) = T_o$ which is constant throughout the tube's cross section.

As time progresses, the exponents $\lambda_n t$ become large so that very soon the first term of the series is the only contributing factor. Neglecting all the terms except the first, it is found that $$\frac{1}{\tau} = \frac{\frac{dT(0,t)}{dt}}{T_w - T(0,t)} \approx \lambda_1 = \frac{k}{a^2 \rho c_p} w_1^2 = 5.79 \frac{V}{z} \quad (10b)$$

and substituting $z = v_o t_o$ this becomes Equation 10. Since all but the first term in the series have been neglected, Equation 10b represents the asymptotic value which $1/\tau$ assumes after the initial transients have died down.

To obtain a feeling for the accuracy of the approximation involved in deriving Equation 10b use the ratio of the second to the first term in the sum Equation 10a for $r=0$, where $$\frac{w_1 J_1(w_1)}{w_2 J_1(w_2)} e^{-(\lambda_2 - \lambda_1)t} = 0.666 e^{-4.26 \frac{t}{\tau}} \quad (10c)$$

This ratio is $10^{-2}$ for $t/\tau = 0.986$, and is $10^{-1}$ for $t/\tau = .45$. The approximation is excellent for times $t \geq \tau$, and is quite good for $t > 0.5\tau$.

Figure 13:
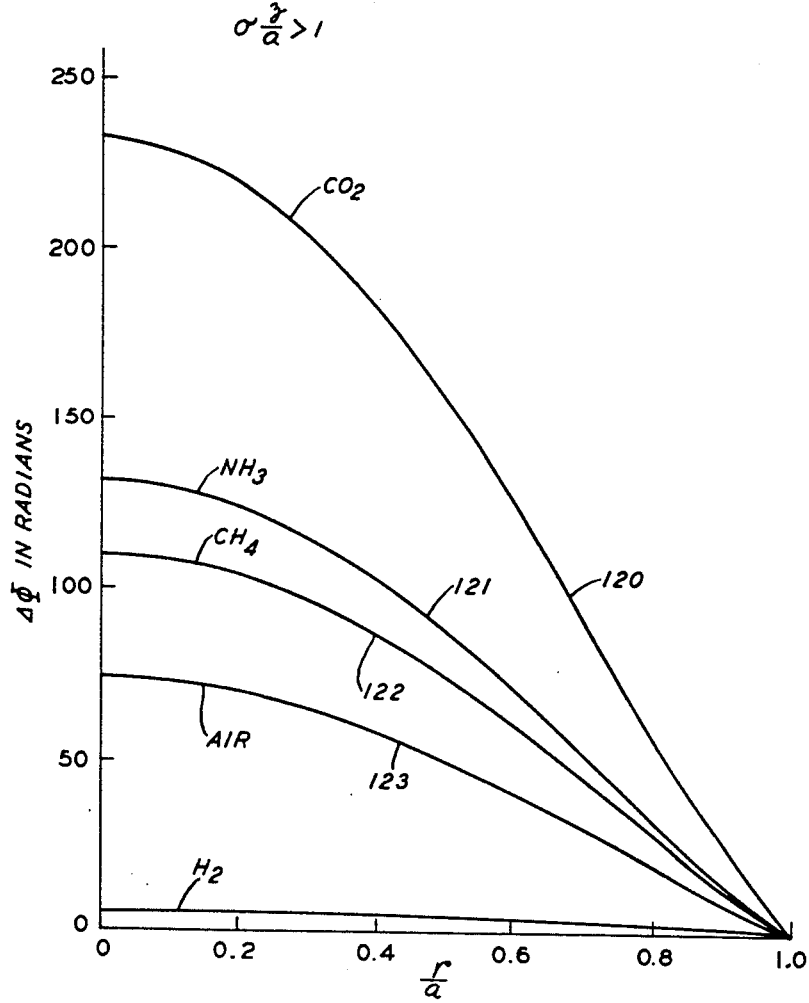

For the specific example illustrated by curves 120 through 123, inclusive, of FIG. 13 for carbon dioxide, ammonia, methane and air, respectively, it was found that for $CO_2$: $\tau = 0.161$ second and for air: $\tau = 0.08$ second.

Equation 10 shows that $V/v_o$ expresses the ratio of the time it takes the gas particles (on the tube axis) to flow through the tube of length $z$ to the heat diffusion rate on the tube axis.

Equation 10 may be used to replace $V/v_o$ in Equation 7 and the other places where $V/v_o$ or $z/a$ appear, resulting (for example) in $$e^{-7.316 \frac{\sigma z}{a}} = e^{-7.316 \frac{V}{v_o}} = e^{-1.265 \frac{t_o}{\tau}}$$

The parameter's lens length $z$ and gas velocity $v_o$ are important variables for other reasons and the first two forms of the exponential may be preferred. It should be noted, however, that $$\tau = 0.173 \frac{a^2 \rho c_p}{k}$$

and typical values are 0.161 second and 0.08 second for $CO_2$ and air, respectively, when $a = 0.125$ inch. It is surprising that this time constant is so short.

Another physical meaning one can give V is that it represents that velocity of gas flow along the pipe axis which assures that $\theta/\theta_o$ drops from its initial value of one at the beginning of the tube to $$\frac{\theta}{\theta_o} = 9.9 \cdot 10^{-4} \approx 10^{-3}$$

on the axis at its end.

*Focusing action*

A lens focuses because the optical path length varies for rays traveling at different distances from its axis.

The focusing action of the lens is described by the phase angle of a ray traveling parallel to the axis of the structure. The phase angle is given by $$\Phi(r,z) = \beta_o \int_0^z n(r,x) dx \quad (11)$$

Here, $\beta_o = 2\pi/\lambda_o$ is the free space propagation constant of the light beam and $n$ the index of refraction of the gas.

$$n(r,x) = 1 + (n_o - 1) \frac{T_o}{T(r,x)} \quad (12)$$

$$\frac{T_o}{T} = \frac{1}{1 + \frac{\theta_o}{T_o}\left(1 - \frac{\theta}{\theta_o}\right)} \approx 1 - \frac{\theta_o}{T_o}\left(1 - \frac{\theta}{\theta_o}\right) \quad (13)$$

The last step is an approximation for $\theta_o/T_o \ll 1$. The temperature in Equation 12 has to be expressed in degrees Kelvin.

If $\Phi(r,z)$ is decomposed into two parts where $$\Phi(r,z) = \varphi + \psi(r,z) \quad (14)$$

the first part $$\varphi = \beta_o\left[1 + (n_o - 1)\left(1 - \frac{\theta_o}{T_o}\right)\right] z \quad (15)$$

is independent of the position $r$ of the ray in the gas lens while the second part $$\psi = \beta_o(n_o - 1)\frac{\theta_o}{T_o} \int_0^z \frac{\theta(r,x)}{\theta_o} dx =$$

$$\beta_o z (n_o - 1)\frac{\theta_o}{T_o}\frac{v_o}{V}\left\{0.202 R_o\left(\frac{r}{a}\right)\left(1 - e^{-7.316\frac{V}{v_o}}\right) - \right.$$

$$0.0183 R_1\left(\frac{r}{a}\right)\left(1 - e^{-44.3\frac{V}{v_o}}\right) +$$

$$\left. 0.00363 R_2\left(\frac{r}{a}\right)\left(1 - e^{-106\frac{V}{v_o}}\right) + 000 \cdots \right\} \quad (16)$$

accounts for the different amount of phase shift in different parts of the lens.

The difference between the phase angle of a ray traveling along the lens axis minus the phase angle of a ray traveling at a distance $r$ from the axis is $$\Delta \Phi = \beta_o z (n_o - 1)\frac{\theta}{T_o}\frac{v_o}{V}\left\{0.202(1 - R_o)\left(1 - e^{-7.316\frac{V}{v_o}}\right) - \right.$$

$$0.0183(1 - R_1)\left(1 - e^{-44.3\frac{V}{v_o}}\right) +$$

$$\left. 0.00363(1 - R_2)\left(1 - e^{-106\frac{V}{v_o}}\right) + \cdots \right\} \quad (17)$$

This form of $\Delta\Phi$ shows clearly its dependence on flow velocity for a fixed tube length $z$. To study the dependence of $\Delta\Phi$ for fixed flow rate and varying length the following form is preferable.

$$\Delta\Phi = \beta_o \sigma(n_o-1)\frac{\theta_o}{T_o}\Big\{0.202(1-R_o)\Big(1-e^{-7.316\frac{\sigma z}{a}}\Big) -$$

$$0.0183(1-R_1)\Big(1-e^{-44.3\frac{\sigma z}{a}}\Big) +$$

$$0.00363(1-R_2)\Big(1-e^{-106\frac{\sigma z}{a}}\Big) + \cdots \Big\}$$

(18)

Figure 8:
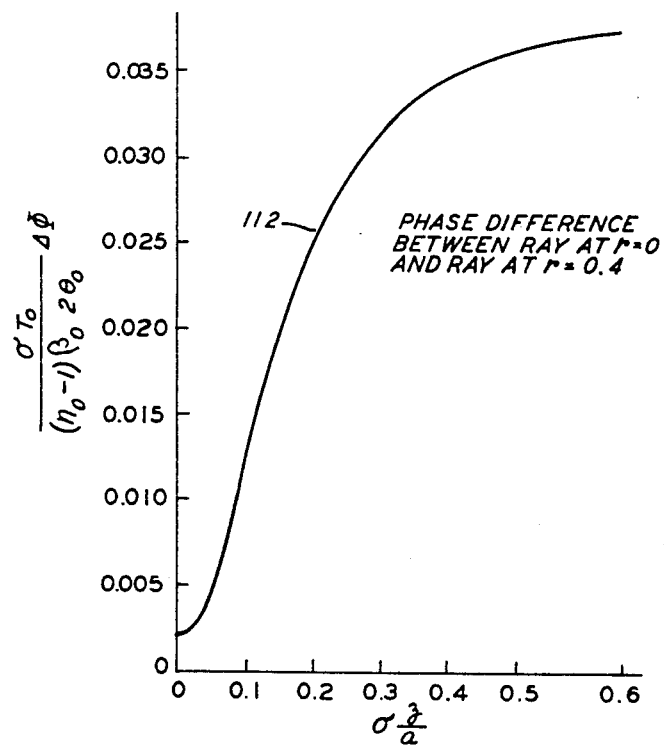

FIG. 8, curve 112, is a plot of $\Delta\Phi$ versus length of lens for $r/a=0.4$. In other words, curve 112 represents the phase difference between a ray on the axis and another at distance $r=0.4a$ from the axis of the lens.

Figure 9:
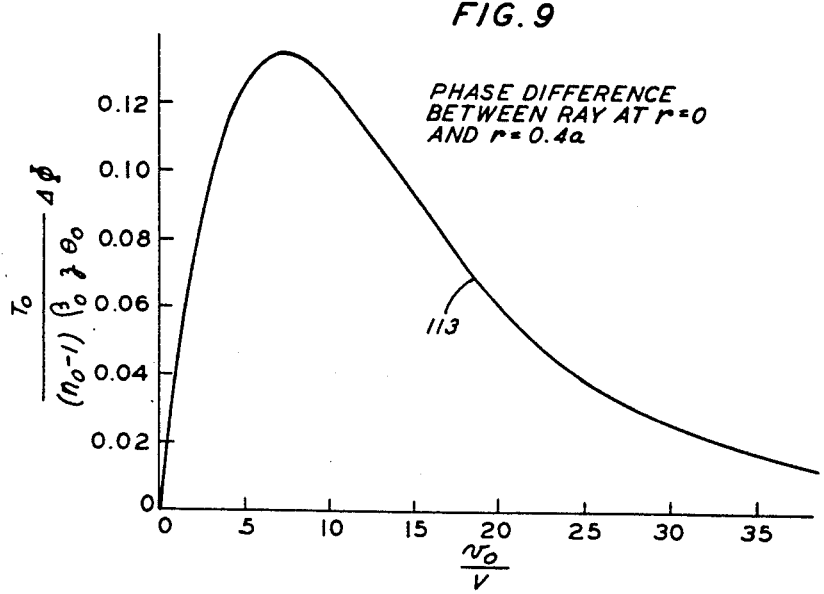

FIG. 9, curve 113, is a plot of the phase difference at a fixed length $z$ as a function of gas velocity. In this case, $\Delta\Phi$ goes through a maximum which for $r/a=0.4$ occurs at $v_o/V=6.9$. The position of this maximum depends somewhat on the radius $r$ of the ray used for phase comparison with the axial ray.

To obtain an expression for the value of $v_o/V$ which brings $\Delta\Phi$, Equation 17, to a maximum:

$$\frac{d(\Delta\Phi)}{d(v_o/V)} = \beta_o z(n_o-1)\frac{\theta_o}{T_o}\Big[0.202(1-R_o)\Big\{1-e^{-7.316\frac{V}{v_o}}\Big(1+7.316\frac{V}{v_o}\Big)\Big\} -$$

$$0.0183(1-R_1)\Big\{1-e^{-44.3\frac{V}{v_o}}\Big(1+44.3\frac{V}{v_o}\Big)\Big\} + 0.00363(1-R_2)\Big\{1-e^{-106\frac{V}{v_o}}\Big(1+106\frac{V}{v_o}\Big)\Big\}\Big]$$

(18a)

The above Equation 18a is set equal to zero. Since the second and third exponentials are small, htey may be neglected (to be justified by the solutions thus obtained) yielding $$e^{-7.316\frac{V}{v_o}}\Big(1+7.316\frac{V}{v_o}\Big) =$$

$$1 - 0.0906\frac{(1-R_1)}{(1-R_o)} + 0.018\frac{(1-R_2)}{(1-R_o)}$$

(18b)

Equation 18b gives the approximate value of $v_o/V$ at the maximum of $\Delta\Phi$ for any chosen radius, $r/a$. Additional terms in Equation 18a can be taken if more accuracy is desired, which was done in computing the $v_o/V$ for $r/a=0.2$ as heretofore given.

The following table gives the values of the position of the maximum $(v_o/V)$ for different values of $r/a$.

| $r/a$ | $(v_o/V)$ |
|---|---|
| 0.2 | 6.73 |
| 0.4 | 6.9 |
| 0.6 | 8.26 |

The table shows that the position of the maximum does not change much with the radial position of the reference ray.

This maximum can be explained physically in $\Delta\Phi$ versus $v_o$ as follows. At very low gas velocity the majority of the gas in the tube is at the same temperature, that is, the temperature of the walls, $T_w$. It is heated up to a time $\tau$ (Equation 9) after entering. With little temperature difference between the gas at $v=0$ and at $r>0$ (averaged over the length $z$ there is little $\Delta\Phi$. As $v_o$ increases, the gas on the axis remains at or near $T_n$ but that nearer the walls is heated because it flows more slowly (Equation 1) and larger $\Delta\Phi$ develops. Beyond some velocity further increases in velocity cause the gas at $r=0.4a$ (for example) to leave the tube at lower and lower temperatures, that is, less temperature difference will exist between $r=0$ and $r=0.4a$ because the transit time of the gas through the tube becomes less than the thermal diffusion time constant $\tau$. Thus at high velocities the $\Delta\Phi$ decreases. Note that this explanation (and the theory) depends upon laminar flow of gas. If there is radial mixing of the gas, less $\Delta\Phi$ would be expected than predicted above, and the maximum in $\Delta\Phi$ versus $v_o$ might not occur.

The second derivative $$\frac{d^2\Phi}{d\big(\frac{r}{a}\big)^2}$$

is a good measure of the effectiveness of the lens for light rays close to its axis. For a glass lens $$\Phi = n\beta_o d(r)$$

where $d(r)$ is the thickness of the lens as a function of the distance from its axis. The radius R of curvature of the glass lens is given by the relation $$\frac{1}{R} = \frac{1}{n\beta_o}\frac{d^2\Phi}{dr^2} \qquad (18c)$$

In order to be able to take the second derivative of $\varphi$, the functions $R_o$, $R_1$, and $R_2$ are expressed by power series with respect to $r/a$. For the second derivative on the axis at $r=0$ it is sufficient to know the coefficient of $(r/a)^2$ in the expansion. Jakob, mentioned above, gives a series expansion of the R functions, $$R_n = 1 - \frac{1}{4}\beta_n^2\Big(\frac{r}{a}\Big)^2 \pm \cdots \qquad (19)$$

with $\beta_o = 2.705$, $\beta_1 = 6.66$ and $\beta_2 = 10.3$.

With these values $$-\Big(\frac{d^2\Phi}{d\big(\frac{r}{a}\big)^2}\Big) = \beta_o z(n_o-1)\frac{\theta_o}{T_o}\frac{v_o}{V}\Big\{0.738\Big(1-e^{-7.316\frac{V}{v_o}}\Big) -$$

$$0.405\Big(1-e^{-44.3\frac{V}{v_o}}\Big) + 0.192\Big(1-e^{-106\frac{V}{v_o}}\Big) + \ldots\Big\}$$

(20)

The maximum of this curve as a function of $v_o/V$ appears at $v_o/V=6.75$.

Figure 10:
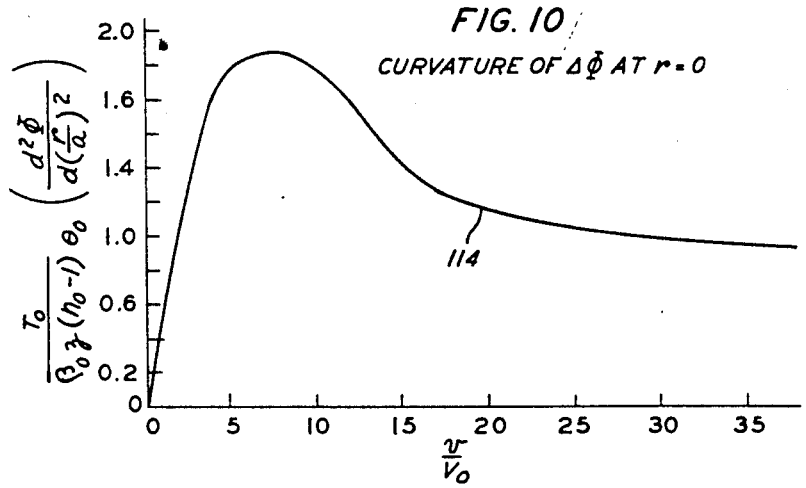
Figure 11:
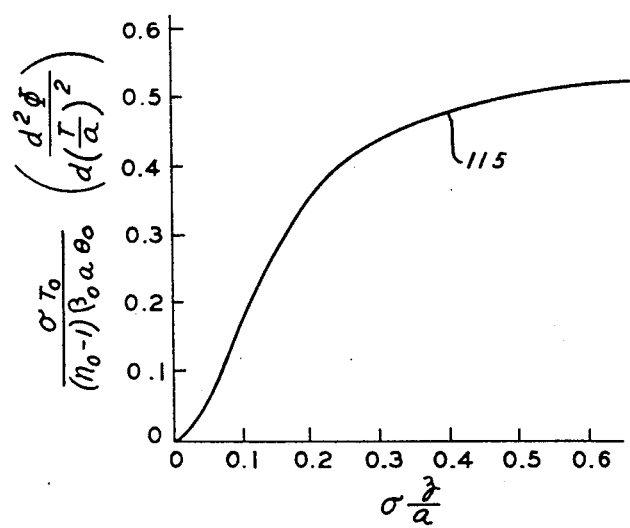

FIG. 10, curve 114, is a plot of a normalized value of $$\frac{d^2\Phi}{d\big(\frac{r}{a}\big)^2}$$

as a function of $v_o/V$ while FIG. 11, curve 115, shows it (with a different normalization) as a function of $$\sigma\frac{z}{a}$$

Figure 12:
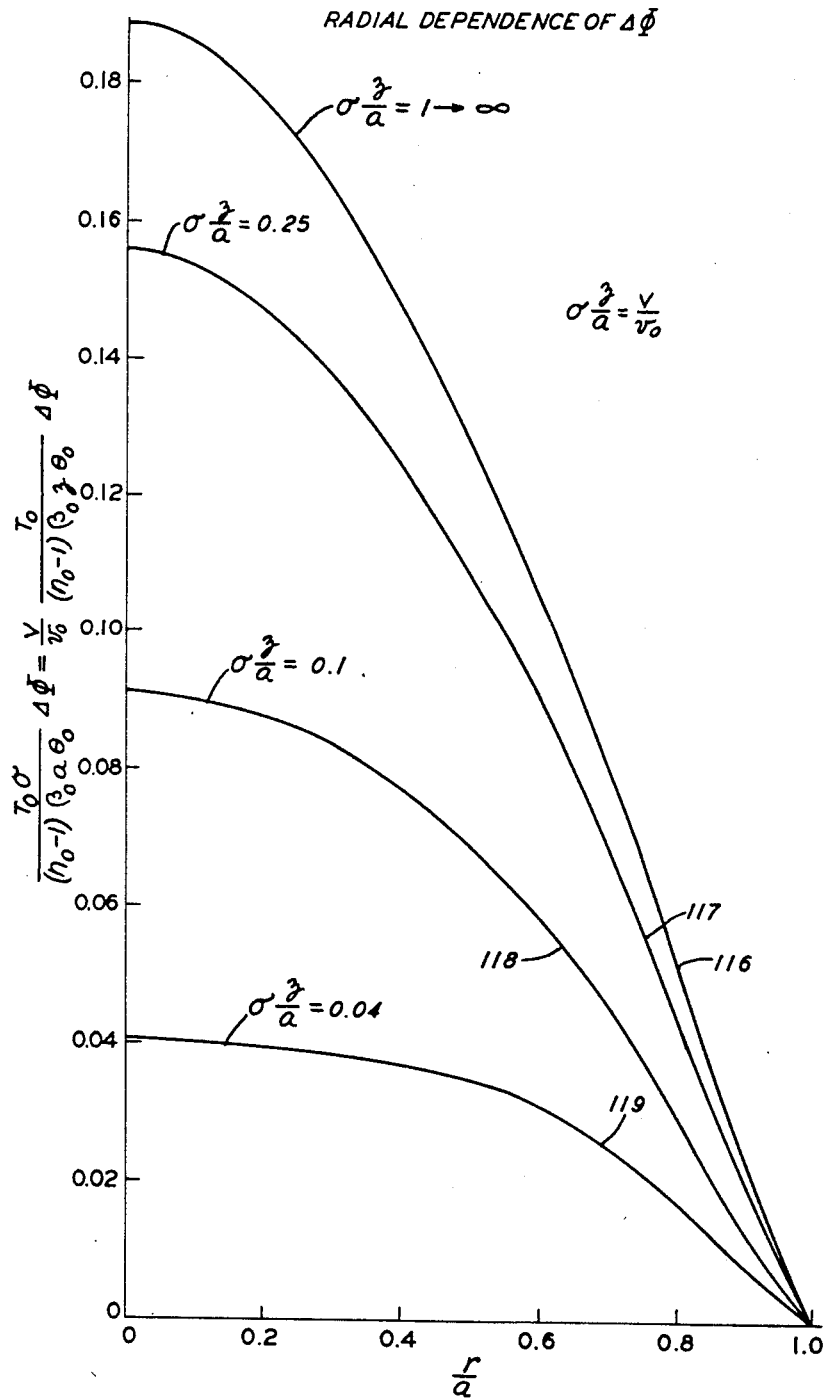

The $r/a$ dependence of $\Delta\Phi$ is illustrated by curves 116 through 119, inclusive, of FIG. 12. Here, $\Delta\Phi$ is the phase of the ray at $r$ minus the phase of the ray at $r=a$.

In order to show what values the phase difference might actually assume and also to compare different gases, $\Delta\Phi$ is plotted as illustrated by curves 120 through 123, inclusive, of FIG. 13 for several gases and the following geometry and flow rate.

$2a = 0.25$ inch
$v_o = 212$ cm./sec. corresponding to 2 Liters/minute or 4.74 miles/hr.

$\beta_0 = 1.07 \times 10^5$ cm.$^{-1}$ corresponding to $\lambda_0 = 5890$ A.
$T_w = 343°$ K.
$T_0 = 293°$ K.

and with the values of $n_0 - 1$ and $\sigma$ as listed in Table I. These curves assume a tube length $z$ so long that no further $\Delta\Phi$ would be realized with a longer $z$ (that is, outgoing gas at uniform temperature).

It is interesting to compare the $r/a$ dependence of $\Delta\Phi$ to the simple function $c(r/a)^2$. For this purpose use Equation 17 which is written so that $\Delta\Phi = 0$ at $r = 0$.

Figure 14:
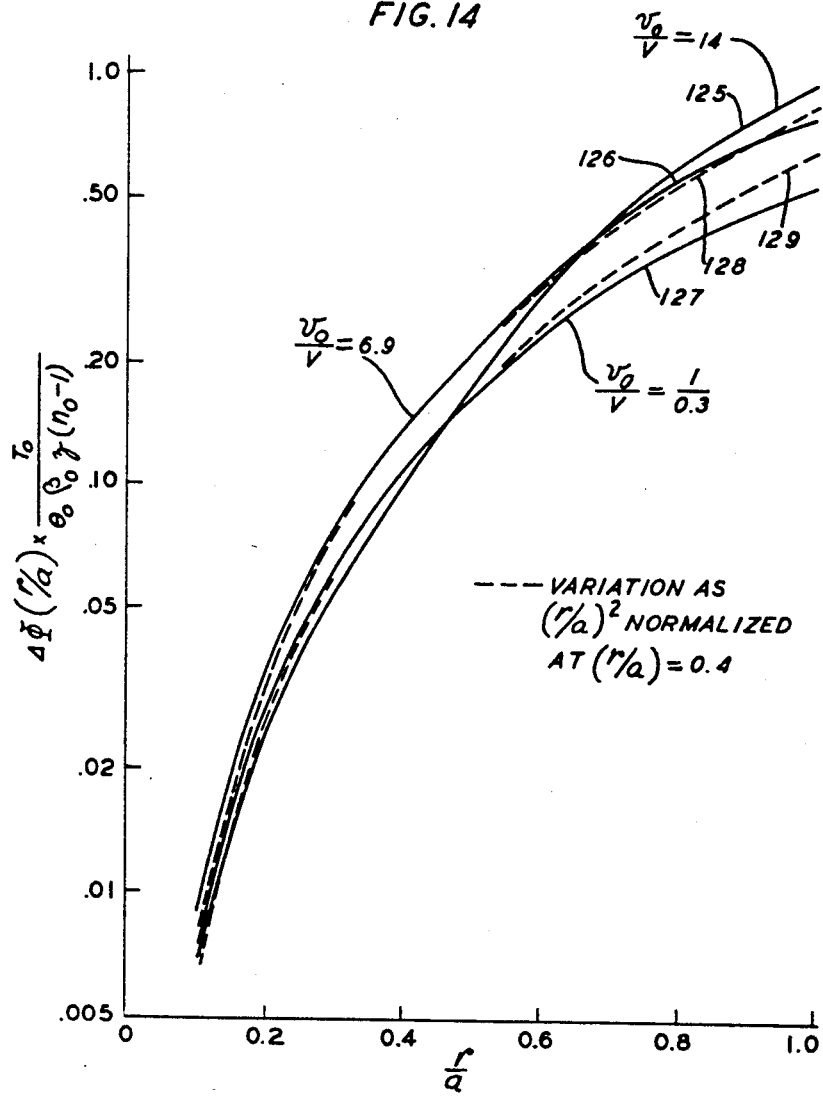

Curves 125 through 127, inclusive, of FIG. 14 give the normalized value of $\Delta\Phi$ as a function of $r/a$ for several values of the gas velocity $v_0/V$. For comparison the function $c(r/a)^2$ is shown by the dotted line curves 128 and 129. The constant $c$ is adjusted so that both curves coincide at $r/a = 0.4$. The actual curves of $\Delta\Phi$ are surprisingly close to the simple square law dependence in all cases. If the gas lens could be treated as a thin lens, it would act very similar to a glass lens with spherically curved surfaces.

Figure 15:
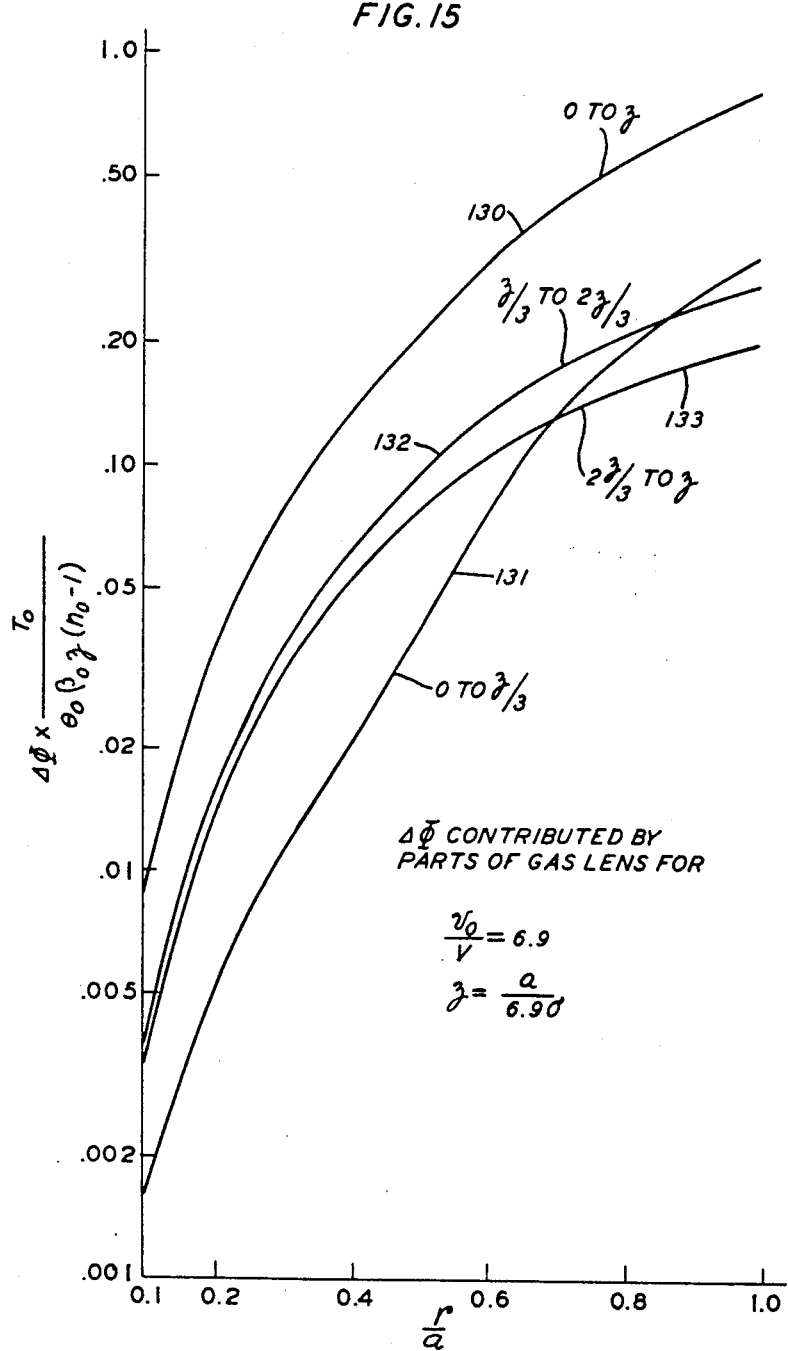

However, the gas lens is not thin and the question presents itself: How do different sections of the lens contribute to the over-all focusing effect? Curves 130 through 133, inclusive, of FIG. 15 show the phase difference $\Delta\Phi$ between a ray on the axis at $r=0$ and a ray at $r$ for a fixed value $v_0/V = 6.9$ for different sections of the lens. The curve 130 showing $\Delta\Phi$ for the section $o \to z$ was shown above as curve 126 of FIG. 14 and is repeated here to facilitate comparison. The other curves 131, 132 and 133 show $\Delta\Phi$ in the first third of the lens (curve $0 \to (\frac{1}{3})z$), the second third (curve $(\frac{1}{3})z \to (\frac{2}{3})z$) and the last third (curve $(\frac{2}{3})z \to z$), respectively. The contributions are surprisingly different at different radii and do not resemble simple $(r/a)^2$ dependences. However, they all add up to the $0 \to z$ curve which does resemble the $(r/a)^2$ dependence very closely as was shown in FIG. 14.

*Figure of merit*

The focusing action of the gas lens becomes independent of the length of the lens if $$\sigma \frac{z}{a} > 1$$

as FIGS. 8 and 11 show. It is also known that for a fixed length of the lens there is an optimum flow velocity as shown by FIGS. 9 and 10.

For practical applications, one would like not only to obtain an effective lens but to do so with a minimum expenditure of power. It is, therefore, interesting to study the lens action, that is $$\frac{d^2\Phi}{d\left(\frac{r}{a}\right)^2}$$

per unit of applied power.

The ratio $$M = -\frac{1}{P} \frac{d^2\Phi}{d\left(\frac{r}{a}\right)^2} \qquad (21)$$

is introduced as the figure of merit of the lens. From Equations 6 and 20

$$M = \frac{2\beta_0}{\pi T_0} \cdot \frac{n_0 - 1}{k} \left[ \frac{F}{1 - 0.820 e^{-7.316 \frac{V}{V_0}}} \right] \qquad (22)$$

with $$F = 0.738 \left(1 - e^{-7.316 \frac{V}{V_0}}\right) - 0.405 \left(1 - e^{-44.3 \frac{V}{V_0}}\right) + 0.192 \left(1 - e^{-106 \frac{V}{V_0}}\right) \qquad (22a)$$

Figure 16:
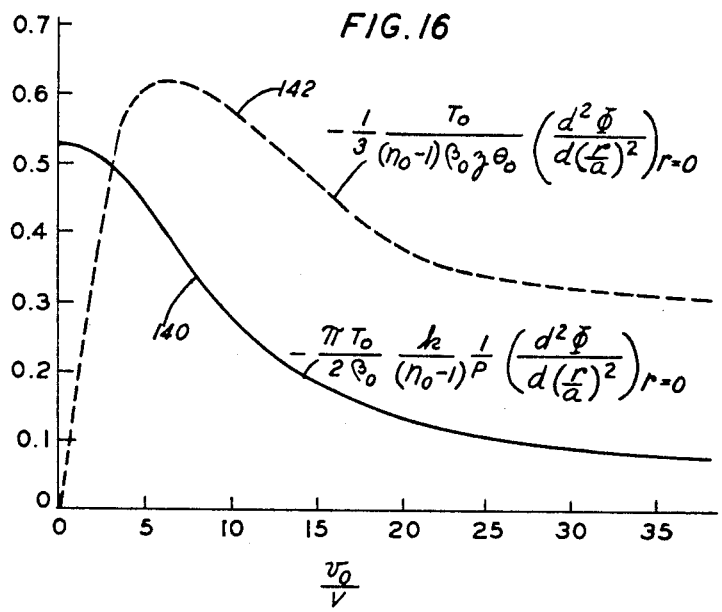

Curve 140, FIG. 16, shows the normalized figure of merit M versus gas velocity $v_0/V$. Curve 142 shows for comparison the focusing effect, as in curve 114 of FIG. 10, obtained from the curvature of $\Delta\Phi$ at $r=0$. From these curves it appears that whereas the optimum velocity $v_0/V \sim 6.9$ for focusing gives a very satisfactory efficiency M, it may be slightly preferable to use velocities slightly below $v_0/V = 6.9$ to enhance the efficiency.

For a given value of $v_0/V$ the figure of merit is proportional to $n_0 - 1/k$. It is advantageous to make this number as large as possible.

The gases in Table I are arranged in decreasing order of $n_0 - 1/k$. Of all the gases listed in that table, carbon dioxide is best suited for a gas lens. This does not mean, however, that gases with larger values of $n_0 - 1/k$ cannot be found.

*Focal length*

It was shown above that $\Delta\Phi$ varies nearly as $(r/a)^2$. In the region where the lens is weak, it may be treated as a thin lens and a simple expression for focal length directly obtained.

For any thin lens it may be shown that the focal length $f$ is given by $$f = \frac{1}{2} \beta_0 \frac{r^2}{\Delta\Phi} \qquad (23)$$

where $\Delta\Phi$ is the phase shift added on axis as compared to that for a ray at radius $r$;
$\beta_0$ = phase constant of the region surrounding the lens.

$\Delta\Phi$ may be obtained from Equation 17 which is given by the following for the gas velocity set to maximize $\Delta\Phi$ at $(r/a) = 0.4$, that is, at $(v_0/V) = 6.9$:

$$\Delta\Phi = 0.839 \left(\frac{r}{a}\right)^2 \frac{\theta_0}{T_0} \beta_0 z (n_0 - 1) \qquad (24)$$

Putting Equation 24 into Equation 23, the following expression is obtained for the focal length of a weak gas lens:

$$f = 0.596 \frac{a^2}{z} \frac{T_0}{\theta_0 (n_0 - 1)} \qquad (25)$$

If $a = 0.125$ inch, $z = 5$ inches, $T_0 = 293°$ K., and $\theta_0 = 20°$ C., it is found that $f$ is substantially 5 feet using $CO_2$ as the gas and substantially 8 feet using air as the gas. The power transferred to the gas with $CO_2$ is found to be 0.0775 cal./sec. or 0.325 watt.

When the gas lens is not weak, one should take into account that the refractive index varies both with radial position and with longitudinal position. A simpler approach, and one which should give a first order answer for gas lenses operated near the velocity producing maximum $\Delta\Phi$ (Equation 17) is to assume a medium within the lens $$n(r, x) = n_a (1 - \frac{1}{2} a_2 r^2) \qquad (26)$$

where $x$ = distance (within lens) from start of lens;
$r$ = radius;
$n_a$ = index of refraction on the axis.

For the gas velocity $v0/V = 6.9$, it may be shown that $$a_2 = \frac{1.68}{n_a a^2} \frac{\theta_0}{T_0} (n_0 - 1) \qquad (27)$$

It has also been shown that the radial position of a ray (or of the axis of a gaussian beam mode) is $$r = r_1 \cos \sqrt{a_2}\, x + \frac{r_i'}{\sqrt{a_2}} \sin \sqrt{a_2}\, x \qquad (28)$$

where $r_i$ = displacement of ray at lens input;
$r_i'$ = slope of ray at lens input.

This general result can be used to specify the focal length of a strong (or weak) lens with reference to FIG.

17. All input rays with zero slope will converge to a point on the axis a distance $d$ beyond the output face of the lens (FIG. 17) where $$d = \frac{1}{\sqrt{a_2}} \cot (\sqrt{a_2}\, t) \qquad (29)$$

and $t$ is the length of the lens. An equivalent thin lens may be located a distance $f$ back from the focal point, where $$f = \frac{1}{\sqrt{a_2} \sin (\sqrt{a_2}\, t)} \qquad (30)$$

This expression for focal length is valid up to $(\sqrt{a_2 t}) = \pi/2$ at which point $d=0$. For $(\sqrt{a_2 t}) > \pi/2$ the rays cross within the lens, per Equation 28. For $(\sqrt{a_2 t}) \ll 1$ it may be shown that Equation 30 passes into Equation 25 and the location of the equivalent thin lens is in the center of the distributed lens.

Summary of preceding analysis

When a cool gas is blown through a warmer tube, the gas at the axis has a lower temperature than that near the walls. Thus the density and refractive index are larger at the axis and a converging lens is formed. If the tube is at a lower temperature than the input gas, a diverging lens is formed.

There is an optimum gas velocity for maximizing the focusing power of such a lens, and expressions are given for this velocity. It turns out that the optimum transit time for gas through the tube is approximately the time constant for temperature changes in a gas at rest in the tube, which for typical gases (air and carbon dioxide) is is about 0.1 second in a one-quarter inch internal diameter tube.

Although not discussed herein, it is found that a one-quarter inch tube six inches long yields (at the optimum velocity for focusing power) a Reynolds number well below that at which turbulence is expected.

Expressions are given for focal length and a figure of merit expressed as focusing power per watt of power transferred to the moving gas.

The best gas is one with a maximum $(n-1)/k$, where $n$ is the refractive index and $k$ is the heat conductivity.

In the guidance of ultrahigh frequency energy beams including light waves for communication, the use of a sequence of lenses of alternately convergent and divergent types is proposed, an illustrative system having been described hereinabove. The mechanism used to cause the focusing may have this alternating character and the question comes to the fore: How well can one focus with such a structure as compared to the use of a sequence of all converging lenses?

"Alternating gradient focusing" has previously been used on electron beams, as discussed for example in section 11.2, starting at page 197 of the book by J. R. Pierce, entitled "Theory and Design of Electron Beams," Second Edition, published by D. Van Nostrand Company, Inc., New York, 1954. It has also been used in connection with particle accelerators as discussed for example in an article by E. D. Courant et al. in the Physical Review, volume 88, pages 1190 to 1196, inclusive, published Dec. 1, 1952. The present presentation is believed to have exposed a discrepancy in the previous determinations of stability conditions and thus to have revealed some interesting and useful properties of alternating gradient focusing not hitherto appreciated. A comparison with conventional focusing using all convergent lenses is included hereinbelow.

Analysis of alternating gradient focusing systems

A sequence of alternating convergent and divergent lenses equally spaced a distance $L$ and of equal focal lengths, $f$, is considered. The general method of analysis used by Pierce in his above-mentioned book is followed. There are two cases to cover, one in which the first lens of the array is a divergent lens (obtained by starting at $n=0$ in FIG. 18) and the other in which the first lens of the array is a convergent lens (obtained by starting at $N=0$ in FIG. 20).

Figure 19:
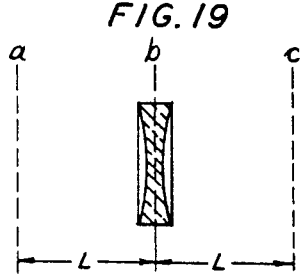

With reference to FIG. 19, and taking the input ray at plane "$a$" to have a slope $r_a'$ and a displacement $r_a$ at plane $b$ will be $$r_b = r_a + L r_a' \qquad (101)$$

$$r' = r_a' + \frac{1}{f} r_b \qquad (102)$$

At plane $c$ this ray will be described by $$r_c = r_b + L r_b' \qquad (103)$$

$$r_c' = r_b' \qquad (104)$$

Eliminating $r_b$ and $r_b'$ from Equations 103 and 104 gives $$r_c = \left(1 + \frac{L}{f}\right) r_a + L\left(2 + \frac{L}{f}\right) r_a' \qquad (105)$$

$$r'_c = \left(1 + \frac{L}{f}\right) r'_a + \frac{r_a}{f} \qquad (106)$$

Figure 18:
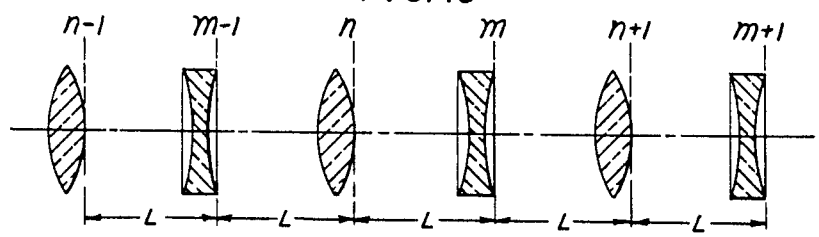

Hence, with reference to FIG. 18, $$r_{n+1} = \left(1 + \frac{L}{f}\right) r_n + L\left(2 + \frac{L}{f}\right) r'_n \qquad (107)$$

$$r'_{n+1} = \left(1 + \frac{L}{f}\right) r_n' + \frac{r_n}{f} - \frac{r_{n+1}}{f} \qquad (108)$$

These two equations lead to $$r_{n+2} - \left[2 - \left(\frac{L}{f}\right)^2\right] r_{n+1} + r_n = 0 \qquad (109)$$

The solution to Equation 109 is $$r_n = A \cos n\theta + B \sin n\theta \qquad (110)$$

where $$\theta = \cos^{-1}\left[1 - \frac{1}{2}\left(\frac{L}{f}\right)^2\right] \qquad (111)$$

and where A and B are constants to be determined.

Equation 111 differs from the corresponding equation on page 200 of Pierce's book, where the convergence designated by Pierce as C is the inverse of the focal length "$f$" used in the present application. The correct condition for stability, from Equation 111 is believed to be $$0 < \frac{1}{2}\left(\frac{L}{f}\right)^2 < 2 \qquad (112)$$

or $$0 < \frac{L}{f} < 2$$

Inserting the boundary conditions, at $n=0$ $$r'_n = r'_0 \qquad (113)$$

$$r_n = r_0 \qquad (114)$$

Using a well known general theorem proving the orthogonality of the effects of $r_0$ and $r'_0$, a solution with those quantities as factors is sought. This leads to the following form for $r_n$, using Equations 110, 107, 113 and 114:

$$r_n = r_0 k_1 \cos(n\theta - \varphi_1) + r'_0 K k_2 \sin n\theta \qquad (115)$$

where $$k_1 = \left[\frac{2 + \frac{L}{f}}{1 - \frac{1}{4}\left(\frac{L}{f}\right)^2}\right]^{1/2} \qquad (116)$$

$$\varphi_1 = |\cos^{-1} k_1^{-1}| \qquad (117)$$

$$k_2 = \frac{\left(\frac{2f}{L}+1\right)}{\sqrt{1-\frac{1}{4}\left(\frac{L}{f}\right)^2}} = \frac{\left(2+\frac{L}{f}\right)}{\sin \theta} \quad (118)$$

Figure 22:
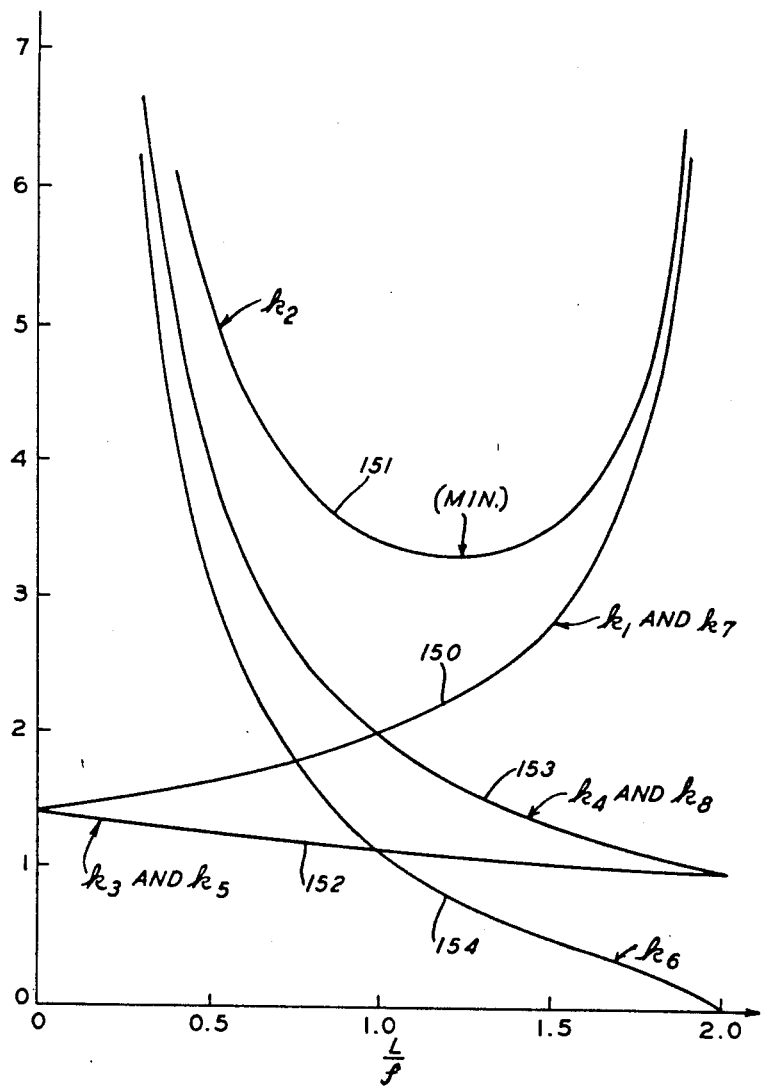

The general form of factors $k_1$ and $k_2$ versus the ratio of lens separation to focal length $L/f$ is shown by curves 150 and 151, respectively, in FIG. 22. Further discussion will be postponed to a later point in this description.

Also of interest is the displacement $r_m$ at output of the $m$th diverging lens (FIG. 1). Using the relation $$r_m = r_n + Lr'_n \quad (119)$$

and using Equation 107 for $r'_n$, Equation 115, for $r_n$ with appropriate trigonometric relations, it can be shown that $$r_m = r_0 k_3 \cos(m\theta - \varphi_3) + r'_0 L k_4 \cos(m\theta - \varphi_4) \quad (120)$$

where $$k_3 = \frac{\sqrt{2+\frac{L}{f}}}{\left(1+\frac{L}{2f}\right)} \quad (121)$$

$$\varphi_3 = |\cos^{-1} k_3^{-1}| \quad (122)$$

$$k_4 = 2f/L \quad (123)$$

$$\varphi_4 = |\cos^{-1} k_4^{-1}| \quad (124)$$

and $\theta$ is again defined by Equation 111. Plots of $k_3$ and $k_4$ are given as curves 152 and 153, respectively, of FIG. 22.

Equations 115 and 120 give the ray displacements at any lens in the system when the input is at a plane adjacent to a converging lens (that is, at $n=0$, FIG. 18). Before discussing interesting features of such ray propagation, the corresponding solutions for the case where the input is adjacent to a diverging lens (that is, at $N=0$, FIG. 20) will be given.

Figure 21:
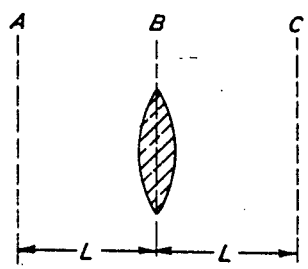

With reference to FIG. 21, and following a derivation similar to that carried out in connection with Equations 101 to 109:

$$r_B = r_A + Lr'_A \quad (125)$$

$$r'_B = r'_A - l_fr_B \quad (126)$$

$$r_C = r_B + Lr'_B \quad (127)$$

$$r'_C = r'_B \quad (128)$$

$$r_C = r_A\left(1-\frac{L}{f}\right) + r_A' L\left(2-\frac{L}{f}\right) \quad (129)$$

$$r'_C = -\frac{r_A}{f} + r'_A\left(1-\frac{L}{f}\right) \quad (130)$$

$$r_{N+1} = r_N\left(1-\frac{L}{f}\right) + r'_N L\left(2-\frac{L}{f}\right) \quad (131)$$

$$r'_{N+1} = -1\frac{r_N}{f} + r'_N\left(1-\frac{L}{f}\right) + \frac{r_{N+1}}{f} \quad (132)$$

$$r_{N+2} - \left[2 - \left(\frac{L}{f}\right)^2\right]r_{N+1} + r_N = 0 \quad (133)$$

Note that Equation 133 is identical to Equation 109 and with the change of $n$ into $N$ the solution for Equation 133 is again Equations 110 and 111. When the initial conditions are put in. at $N=0$, $r_N=r_0$ and $r'_N=r'_0$ $$r_N = r_0 k_5 \cos(N\theta + \varphi_5) + r'_0 L k_6 \sin N\theta \quad (134)$$

where $$k_5 = \sqrt{\frac{2-\frac{L}{f}}{1-\frac{1}{4}\left(\frac{L}{f}\right)^2}} = \frac{\frac{L}{f}\sqrt{2-\frac{L}{f}}}{\sin \theta} \quad (135)$$

$$\varphi_5 = |\cos^{-1} k_5^{-1}| \quad (136)$$

$$k_6 = \frac{\left(\frac{2f}{L}-1\right)}{\sqrt{1-\frac{1}{4}\left(\frac{L}{f}\right)^2}} = \frac{\left(2-\frac{L}{f}\right)}{\sin \theta} \quad (137)$$

It may be shown that $k_5$ is identical to $k_3$, Equation 121. For $r_M$ $$r_M = r_0 k_7 \cos(M\theta + \varphi_7) + r_0 L k_8 \cos(M\theta - \varphi_8) \quad (138)$$

where $$k_7 \left[\frac{2}{1-\frac{L}{2f}}\right]^{1/2} \quad (139)$$

$$\varphi_7 = |\cos^{-1} k_7^{-1}| \quad (140)$$

$$k_8 = 2f/L \quad (141)$$

$$\varphi_8 = |\cos^{-1} k_8^{-1}| \quad (141a)$$

Note $k_8$, Equation 141, and $\varphi_8$, Equation 141a, are identical to $k_4$ and $\varphi_4$; it may also be shown that $k_7$ is identical to $k_1$. Plots of $k_5$, $k_6$, $k_7$, $k_8$ are given as curves 152, 154, 150 and 153, respectively, in FIG. 22.

*Relations for a sequence of converging lenses*

For comparison purposes, reference may be had to the case of a sequence of identical converging lenses equally spaced. The analysis is similar to that above for the "alternating gradient focusing lenses." The results are as follows. Let the lens spacing be S, and the focal length be $f$. Then the displacement $r_p$ at the $p$th lens is $$r_p = r_0 k_9 \cos(p\delta - \varphi_9) + r_0' S k_{10} \sin p\delta \quad (142)$$

where $$k_9 = \sqrt{\frac{\frac{4f}{S}}{\frac{4f}{S}-1}} \quad (143)$$

$$\varphi_9 = |\cos^{-1} k_9^{-1}| \quad (144)$$

$$k_{10} = \frac{\sqrt{\frac{f}{S}}}{\sqrt{1-\frac{S}{4f}}} = \frac{1}{\sin \delta} \quad (145)$$

$$\delta = \cos^{-1}\left[1-\frac{S}{2f}\right] \quad (146)$$

$$\frac{S}{f} = 2(1 - \cos \delta) \quad (146a)$$

The system is stable in the sense that an input displacement $r_0$ or slope $r_0'$ will remain bounded as $p$ is increased if $$0 < \frac{S}{f} < 4 \quad (147)$$

*Stability comparison*

Figure 20:
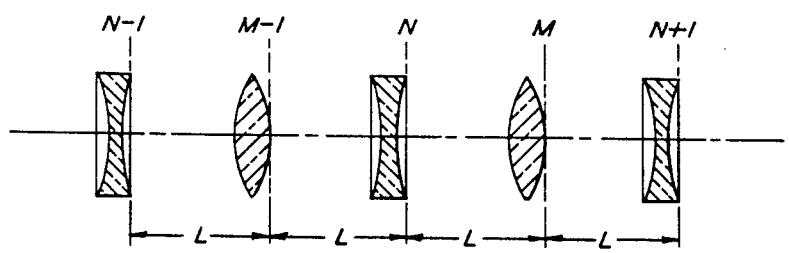

Since the converging lenses in FIG. 18 or FIG. 20 are spaced a distance 2L, a comparison of Equations 147 and 112 shows that the alternating gradient focusing system formed by adding a divergent lens halfway between the convergent lenses of an all-convergent lens system has the same stability condition as the original system. At a later point it will be shown that this is reasonable physically.

*The weak lens case*

When the lenses are weak, that is, when $2f/L \gg 1$, the general expressions may be simplified to show some remarkable properties of alternating gradient focusing.

When the first lens is a diverging one, Equations 115 and 120 yield $$r_m = r_n = \sqrt{2}r_o \cos\left(n\theta - \frac{\pi}{4}\right) + r'_o(2f) \sin N\theta \quad (148)$$

and when the first lens is a converging one Equations 134 and 138 yield $$r_N = r_M = \sqrt{2}r_o \cos\left(N\theta + \frac{\pi}{4}\right) + r'_o(2f) \sin N\theta \quad (149)$$

These expressions show that for an input ray displacement without slope the maximum displacement of the transmitted ray (as $n$ or $N$ varies) is $\sqrt{2}$ times the input ray displacement, independent of both focal length and lens spacing. Also, for an input ray of zero displacement but finite slope $r'_o$, the maximum displacement of the transmitted ray is $2fr'_o$ independent of lens spacing $L$. The angle $\theta$ is dependent on $f$ and $L$ goes to zero as $f$ approaches infinity.

In an all-convergent lens system the similar condition $4f/S \gg 1$ leads to (from Equation 142

$$r_p = r_o \cos p\delta + r'_o \sqrt{fS} \sin p\delta \quad (150)$$

In comparing the alternating gradient system to the all-convergent lens system for weak lenses, it is seen that for an input ray with zero slope $r'_o$ but finite displacement $r_o$ the maximum output displacement for the alternating gradient system is $\sqrt{2}$ times that of the all-convergent lens system. For input ray displacement $r_o = 0$ but finite $r'_o$ it is seen that the maximum output displacement for the alternating gradient system is larger than for the all-converging lens system by the factor (see Equations 148 and 150:

$$\frac{2fr'_o}{\sqrt{fS}r'_o} = \sqrt{\frac{4f}{S}} \quad (151)$$

The assumption of weak lenses made $4f/S \gg 1$ so Equation 151 is a factor of two or more.

In this weak lens case both $\theta$ and $\delta$ are small angles, and from Equations 111 and 146

$$\theta \simeq \frac{L}{f} \quad (152)$$

$$\delta \simeq \sqrt{\frac{S}{f}} \quad (153)$$

Using the case of $S=2L$, which is the alternating gradient system formed by adding a diverging lens in between the lenses of an all-convergent lens system $$\frac{\theta}{\delta} = \sqrt{\frac{S}{4f}} \quad (154)$$

Since $4f/S \gg 1$ by the weak lens definition $\theta/\delta$ is less than unity and the period of the alternating gradient system encompasses a great many more convergent lenses than does the all-convergent lens system with the same spacing of convergent lenses. This is as would be expected.

*Optimum focal lengths*

Inquiry will now be made as to whether there is a best value for the lens strength in order to minimize output ray displacement. On the assumption that the sine and cosine terms of Equations 115, 120, 134, 138 and 142 go through unity for some number of lenses, the question is whether or not the coefficients $k_1, k_2 \ldots k_{10}$ have any minima.

Figure 23:
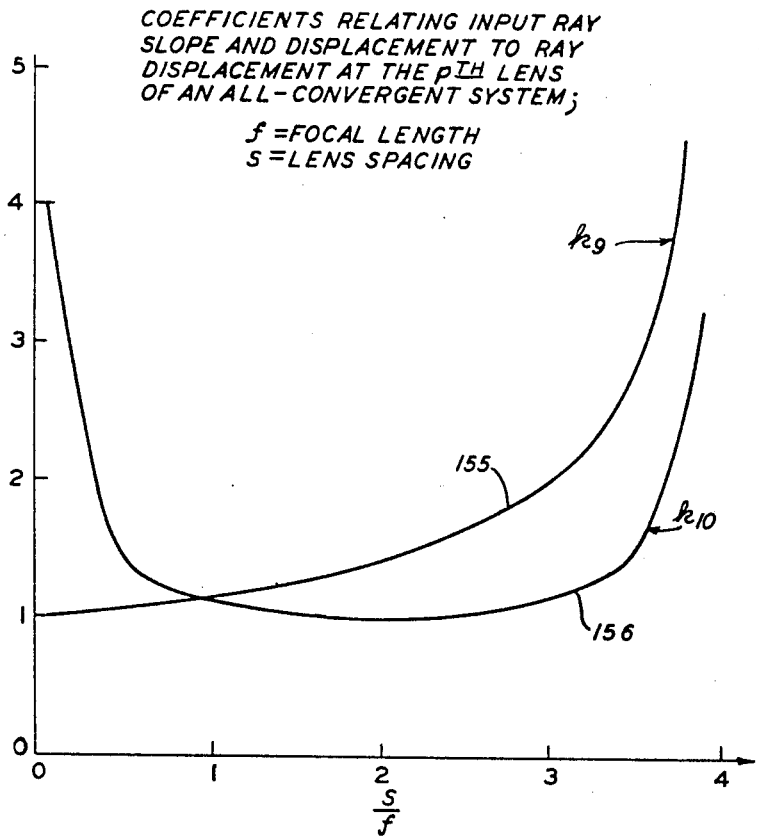
Figure 24:
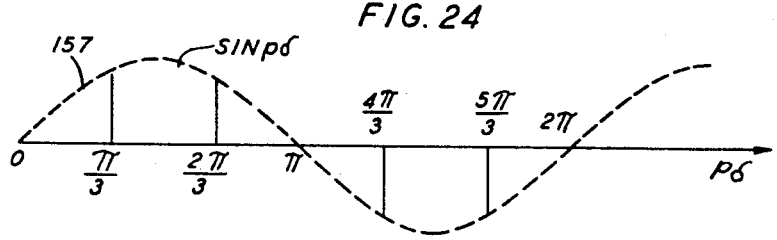
Figure 26:
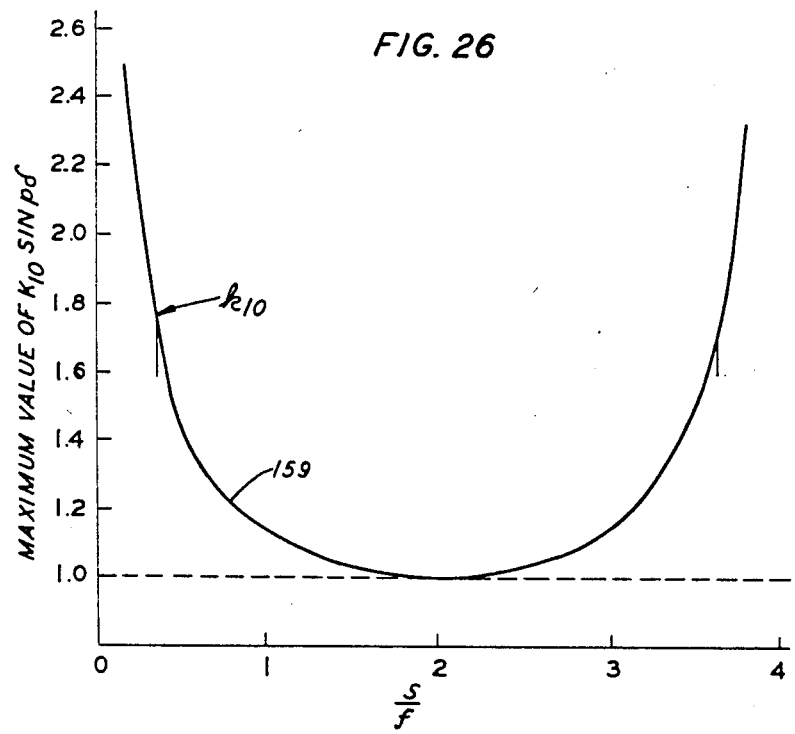

For the all-convergent lens system, FIG. 23, curve 155, illustrates that $k_9$ has no useful minimum but $k_{10}$ represented by curve 156 relating input ray slope to output ray displacement, as in Equation 142, does have a minimum. By setting $$\frac{d}{df}(k_{10}) = 0 \quad (155)$$

it is found that $$\left.\frac{S}{f}\right|_{\text{optimum}} = 2 \quad (156)$$

at which condition $k_{10} = 1.0$. Note that the displacement $r_p$ due to $r'_o$ is $r'_o S k_{10} \sin p\delta$ so that there is a minimum in this displacement when $k_{10}$ is a minimum provided $\sin p\delta$ goes through unity for some number of lenses $p$. This is the most typical case but there are notable exceptions. Suppose, for example, $\delta$ of Equation 146 is $\pi/3$, corresponding to $S/f=1$; then $p\delta = \pi/3, 2\pi/3, \pi/4\pi/3$, et cetera, as illustrated in FIG. 24, curve 157, FIG. 25, curve 158, and $\sin p\delta$ never exceeds $\sin \delta$. Hence the maximum value of $r'_o S k_{10} \sin p\delta$ is $r'_o S$ for $S/f=1$. It is shown hereinafter that there is an infinite series of such discrete values, but the largest departure of the maximum value of $$r'_o S k_{10} \sin p\delta$$

from $k_{10}$ is fifteen percent, occurring at $S/f$ values of 1 and 3 as illustrated in FIG. 26, curve 159.

Turning now to the alternating gradient system, the only coefficient having a useful minimum is $k_2$ of Equation 115, relating input ray slope to ray displacement at the converging lenses of FIG. 18. The minimum in $k_2$ is found by setting $$\frac{d}{df}(k_2) = 0 \quad (157)$$

which leads to the equation $$\left(\frac{L}{f}\right)^3 + 4\left(\frac{L}{f}\right)^2 - 8 = 0 \quad (158)$$

The appropriate root of this equation is $$\left.\frac{L}{f}\right|_{\text{optimum}} = 1.237 \quad (159)$$

at which calculation $\theta = 76.4°$, and $k_2 = 3.33$.

FIG. 22, curve 151 shows this minimum is sharper than the corresponding one for $k_{10}$ of the all-converging lens system, FIG. 23, curve 156. Note that $k_2 \sin n\theta$ of Equation 115 contains the $\sin n\theta/\sin \theta$ factor so once again (as described hereinafter) for $\theta = \pi/3$ and other values, the maximum value of $k_2 \sin n\theta$ will be somewhat less than the value of $k_2$.

It is important to compare the optimized focusing effect of the alternating gradient system to that for the all-convergent lens system. The comparison is made on the alternating gradient system formed by adding a diverging lens of equal focal length in between the lenses of an all-convergent lens system; then $S=2L$. The optimized maximum displacement due to input ray slope is $$r'_o S = 2r'_o L$$

for the convergent lens system, and is 3.33 $r'_o L$ for the alternating gradient system. It is remarkable that the focusing effect of the alternating gradient system is so nearly the same as that of the all-convergent lens system. In practice it is often advantageous to get the focusing action in a manner that inherently reverse itself periodically. This analysis shows that such structures are neary as effective as those wherein the focusing effect is always convergent.

FIG. 22, curves 150, 151 and 152, shows that the focal length which is optimum with respect to the input ray slope ($k_2$) is also an acceptable region with respect to input ray displacement ($k_1$ and $k_3$).

*Ray paths*

Figure 27:
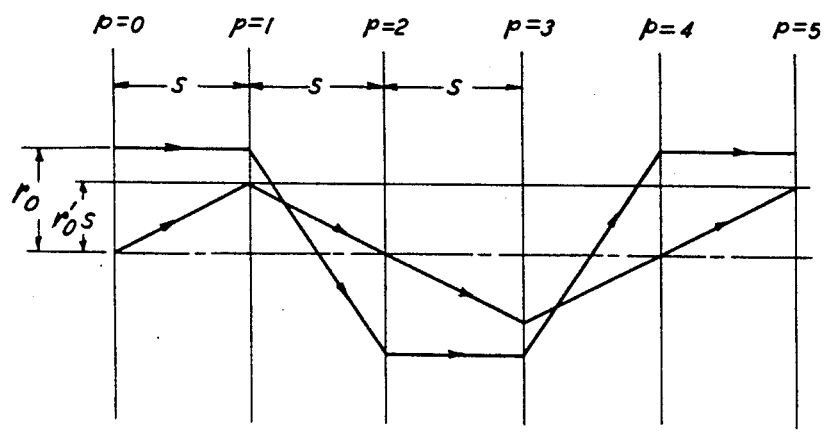
Figure 28:
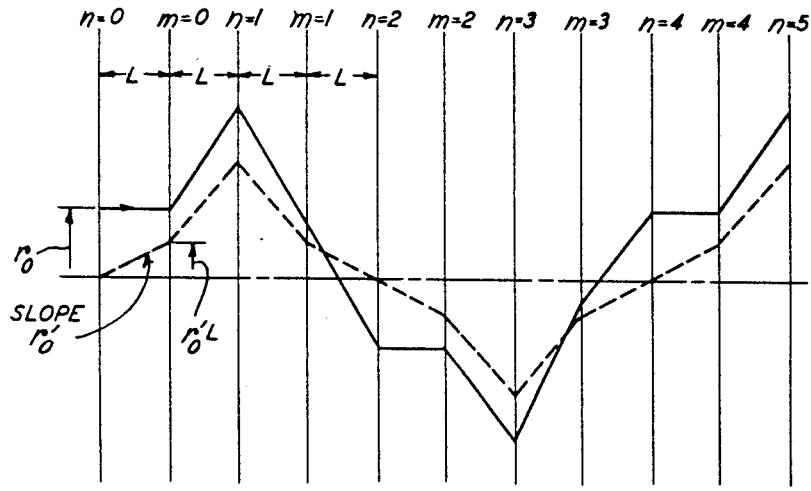
Figure 29:
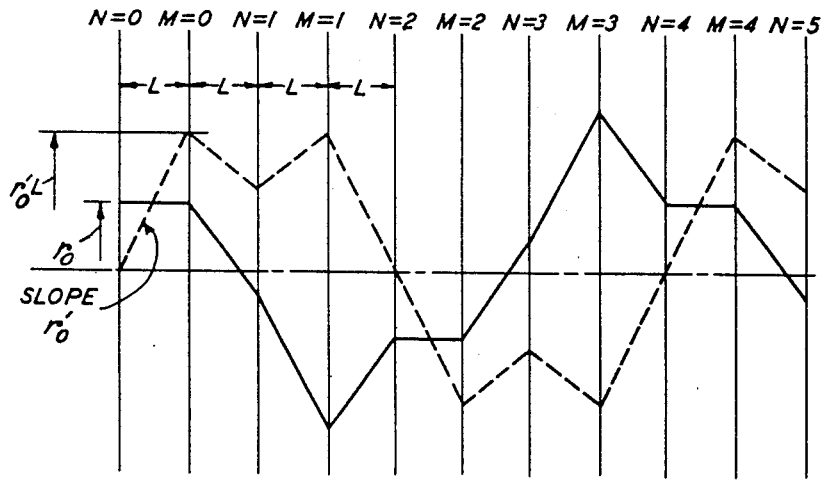

One can get a useful physical feel for the wave propagation by tracing the rays in a few of the important cases. For the all-convergent lens system optimized according to Equation 156, FIG. 27 shows the ray paths for a zero-slope finite-displacement input ray and for a zero-displacement finite-slope input ray. Note that $k_9 = \sqrt{2}$, with $S = 2f$ in Equation 143, but $k_9 \cos(p\delta - \varphi_9)$ is always $\pm 1$ for any $p$. (The angle $\varphi_9 = 45°$.) This is an example of the caution that must be exercised in regarding the $k$'s as maximum values of the various terms in $r_n$, $r_m$, $r_p$, et cetera. Here $\delta = 90°$ (Equation 142) and a period is completed in four lenses. It can be demonstrated that the response of an arbitrary input ray can be obtained by a linear superposition of the responses shown in FIG. 27.

For the alternating gradient system, the optimum according to Equation 159 corresponds to an angle $\theta$ of Equations 115, 120, 134 and 138 or 76.4° which makes the ray path periodic only at a very large number of lenses. However, a very useful feel can be obtained from the ray paths for $\theta = 90°$, corresponding to $L = \sqrt{2}f$ and which gives a value of $k_2$ only slightly larger than the minimum value $(2+\sqrt{2}$ compared to 3.33). These ray plots are in FIGS. 28 and 29 for the two types of input rays at the two possible points in the alternating gradient system. Note that input ray displacement causes the same maximum displacement in the response regardless of where it occurs. Input ray slope is much more serious when it occurs in front of a diverging lens than when it occurs in front of a converging lens. Again, the response to arbitrary input rays can be obtained by adding the plotted responses.

Figure 30:
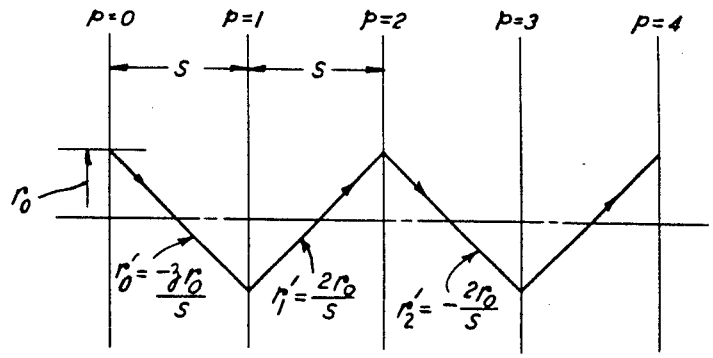
Figure 31:
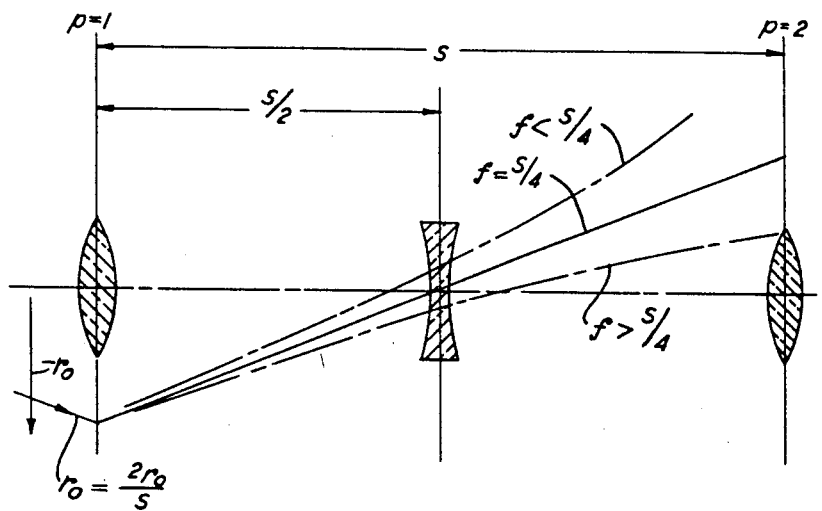

One can gain a little feel for the stability comparison made previously by looking at FIGS. 30 and 31. Even though the $r_o$ term and the $r_o'$ term of Equation 142 for the all-convergent lens system go to infinity individually when $S = 4f$, a suitable combination of input ray slope and displacement remains bounded and this is illustrated in FIG. 30. One can obtain these values of $r_p$ from Equation 142 by a suitable limiting process. It is helpful to start with the alternative form of Equation 142:

$$r_p = r_o \left\{ \cos p\delta + \frac{1}{\sqrt{\frac{4f}{S}-1}} \sin p\delta \right\} + r_o' S k_{10} \sin p\delta \quad (142a)$$

Any reduction in focal length $f$ causes instability, and any increase in $f$ leaves the system completely stable. It is clear that adding a lens of any kind at the midpoint between lenses in FIG. 30 will not alter the propagation of that ray. In FIG. 31 it is evident that adding a diverging lens in between the converging lenses will cause reductions in the focal length of the $p=1$ converging lens to make the ray sent on to the $p=2$ lens diverge even more; for increases in the focal length of the $p=1$ lens, the diverging lens reduces the angle of the ray sent on to the $p=2$ lens. Hence, it is plausible that the addition of the diverging lens between the converging lenses does not alter the stability requirement on the focal lengths.

As stated hereinabove, there is an infinite series of discrete values $r_o' S k_{10} \sin p\delta$. Accordingly, the maximum value that the term $r_o' S k_{10} \sin p\delta$ of Equation 142 can take as a function of lens number $p$ when the objective is to minimize the term through appropriate choice of focal length is examined. It has been shown above that $k_{10}$ has a minimum at $S = 2f$. This corresponds to a value of $\delta = \pi/2$ from Equation 146 and it is evident that $$\sin p\delta = \sin p\frac{\pi}{2}$$

is either zero or unity for all integral values of $p$.

In the more general case, it is necessary to know the value of $$k_{10} \sin p\delta = \frac{\sin p\delta}{\sin \delta} \quad (160)$$

When it is recognized that $p$ may take on all integral values greater than zero, it follows that the maximum value of $(\sin p\delta)/\sin \delta$ as $p$ varies can never be less than unity for any fixed $\delta$.

It is possible for $(\sin p\delta)/\sin \delta$ to have a maximum value which is smaller than $k_{10} = 1/\sin \delta$. That is to say, $\sin p\delta$ does not necessarily go through unity even though $p$ ranges from zero to infinity in integral steps.

Figure 25:
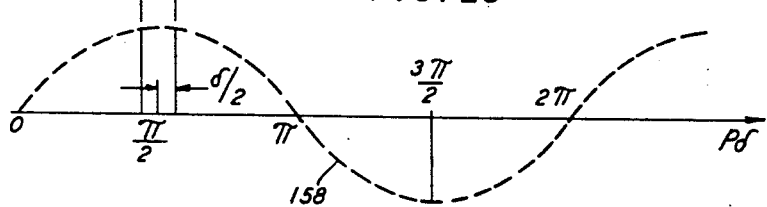

Referring to FIG. 25, it is clear that the maximum value of $\sin p\delta$ will be less than unity if $$\delta\left(q + \frac{1}{2}\right) = \frac{\pi}{2} \quad (161)$$

or $$\delta = \frac{\pi}{2q+1} \quad (162)$$

where $q = 1, 2, 3, \ldots$. It also is true that $\sin p\delta$ will have a maximum value less than unit for $$\delta = r\left(\frac{\pi}{2q+1}\right) \quad (163)$$

where $r = 1, 2, 3, 4, \ldots$.

The values of $S/f$ corresponding to these values of $\delta$ and the resultant values of maximum $k_{10} \sin p\delta$ are given in Table II below. Column (5) of Table II shows the ratio of $k_{10}$ to the maximum of $k_{10} \sin p\delta$ and is a measure of the error made in assuming $\sin p\delta$ goes through unity. That ratio is $1/\cos(\delta/2)$ where $\delta$ is given by Equation 162. All values for a given $q$ in Equation 163 result in the same error but the various values of $r$ indicate the values of $S/f$ at which that error will appear.

TABLE II

| (1) | (2) | (3) | (4) | (5) |
|---|---|---|---|---|
| $\delta$ | $S/f$ | $k_{10}$ | Maximum Value of $k_{10} \sin p\delta$ | Column (3)/Column (4) |
| $\pi/2$ | 2 | 1.0 | 1.0 | 1.0 |
| $\pi/3$ | 1 | 1.15 | 1.0 | 1.15 |
| $2\pi/3$ | 3 | 1.15 | 1.0 | 1.15 |
| $\pi/5$ | 0.38 | 1.70 | 1.62 | 1.05 |
| $2\pi/5$ | 1.38 | 1.05 | 1.0 | 1.05 |
| $3\pi/5$ | 2.62 | 1.05 | 1.0 | 1.05 |
| $4\pi/5$ | 3.62 | 1.70 | 1.62 | 1.05 |
| $\pi/7$ | .194 | 2.31 | 2.255 | 1.023 |
| $2\pi/7$ | .750 | 1.28 | 1.25 | 1.023 |
| $3\pi/7$ | 1.554 | 1.023 | 1.0 | 1.023 |
| $4\pi/7$ | 2.444 | 1.023 | 1.0 | 1.023 |
| $5\pi/7$ | 3.226 | 1.28 | 1.25 | 1.023 |
| $6\pi/7$ | 3.806 | 2.31 | 2.255 | 1.023 |

FIG. 26 summarizes the data of Table II; for $p$ ranging up to infinity it is only at the discrete values of $\delta$ given by Equation 163 that the maximum of $k_{10} \sin p\delta$ differs from $k_{10}$.

If $p$ were finite and the ratio $S/f$ was varied, the plot of FIG. 26 would presumably show finite width dips of the same over-all depth as those plotted.

Conclusion

Alternating gradient focusing is surprisingly close to an all-convergent lens system in focusing ability and may be preferred if practical matters such as structural features or cost favor the alternating gradient system.

Numerous and varied modifications and rearrangements of the above-described illustrative embodiments of the invention will readily occur to those skilled in the art. It is to be understood that the embodiments are illustrative and are not to be taken as limiting the scope of the inventive principles disclosed.

What is claimed is:

1. A gas lens for electromagnetic wave energy comprising an elongated tube encompassing a flowing gas; said gas being transparent to said wave energy; means for establishing a radial temperature gradient within said flowing gas comprising means for maintaining a temperature differential between said tube and the gas entering said tube.

2. The gas lens according to claim 1 including means for varying the temperature differential between said tube and the gas entering said tube.

3. The gas lens according to claim 1 including means for varying the rate of flow of said gas through said tube.

4. The gas lens according to claim 1 including means for varying the pressure of the gas within said tube.

5. The lens of claim 1 in which the temperature of the tube is maintained above the temperature of the gas entering the tube.

6. The lens of claim 1 in which the temperature of the tube is maintained below the temperature of the gas entering the tube.

7. A gas lens system for guiding a laser beam or the like comprising, in combination; an elongated conduit encompassing a flowing gas; said gas being transparent to said guided beam; and a plurality of elongated heating elements for producing a radial temperature gradient within said flowing gas distributed at intervals along said conduit.

8. A gas lens system for guiding electromagnetic radiation comprising, in combination; an elongated conduit; means for causing a flow of gas through said conduit; said gas being transparent to said radiation; and a plurality of means distributed at intervals along said conduit for maintaining a temperature differential between each of said means and the gas flowing along said conduit whereby a radial temperature gradient is produced within said flowing gas by each of said means.

9. The system of claim 8 in which all said distributed means are maintained at a temperature above the temperature of the gas flowing through said conduit.

10. The system of claim 8 in which every other one of said distributed means is maintained at a temperature above the temperature of the gas flowing through said conduit to form a positive gas lens, and the intermediate ones of said distributed means are maintained at a temperature below the said gas temperature to form a negative gas lens.

11. The alternating gradient focusing gas lens system in accordance with claim 10 wherein the ratio of $L/f$ is substantially equal to 1.237 where L is the distance between consecutive gas lenses and $f$ is the focal length for all lenses of the system.

12. The system of claim 8 in which the flow of gas through said conduit is restricted to a maximum rate at which turbulence is not created in said gas.

References Cited

UNITED STATES PATENTS

| | | | |
|---|---|---|---|
| 2,947,841 | 8/1960 | Pickles et al. | 350—61 X |
| 2,980,802 | 4/1961 | Bracey et al. | 350—179 |
| 3,310,356 | 4/1967 | Borberg | 350—63 |

JOHN K. CORBIN, *Primary Examiner.*